United States Patent
Li et al.

(10) Patent No.: US 12,028,867 B2
(45) Date of Patent: Jul. 2, 2024

(54) GRANT BASED PUSCH TRANSMISSION AND CONFIGURED GRANT BASED PUSCH TRANSMISSION IN NR SYSTEMS OPERATING ON UNLICENSED SPECTRUM

(71) Applicant: Apple Inc., Cupertino, CA (US)

(72) Inventors: Yingyang Li, Cupertino, CA (US); Salvatore Talarico, Cupertino, CA (US); Yongjun Kwak, Cupertino, CA (US); Jose Armando Oviedo, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 338 days.

(21) Appl. No.: 17/420,575

(22) PCT Filed: Jan. 11, 2020

(86) PCT No.: PCT/US2020/013253
§ 371 (c)(1),
(2) Date: Jul. 2, 2021

(87) PCT Pub. No.: WO2020/146854
PCT Pub. Date: Jul. 16, 2020

(65) Prior Publication Data
US 2022/0070910 A1 Mar. 3, 2022

Related U.S. Application Data

(60) Provisional application No. 62/791,701, filed on Jan. 11, 2019.

(51) Int. Cl.
H04W 72/23 (2023.01)
H04L 1/1607 (2023.01)
(Continued)

(52) U.S. Cl.
CPC ........... *H04W 72/23* (2023.01); *H04L 1/1614* (2013.01); *H04L 1/1812* (2013.01); *H04L 1/1887* (2013.01)

(58) Field of Classification Search
CPC .... H04W 72/23; H04L 1/1614; H04L 1/1812; H04L 1/1887
See application file for complete search history.

(56) References Cited

U.S. PATENT DOCUMENTS

| 11,445,494 B2 | 9/2022 | Golitschek Edler von Elbwart et al. |
| 2015/0365931 A1 | 12/2015 | Ng et al. |

(Continued)

FOREIGN PATENT DOCUMENTS

CN 107113787 A 8/2017

OTHER PUBLICATIONS

International Search Report dated Aug. 5, 2020, for PCT Appl. No. PCT/US2020/013253, 3 pages.
(Continued)

*Primary Examiner* — Justin Y Lee
(74) *Attorney, Agent, or Firm* — Sterne, Kessler, Goldstein & Fox P.L.L.C.

(57) ABSTRACT

Systems, apparatuses, methods, and computer-readable media are provided for a wireless communication on an unlicensed spectrum. An access point (AP) of the wireless communication system includes a processor circuitry, and radio front end circuitry coupled to the processor circuitry. The processor circuitry is configured to schedule multiple transmission time intervals (multi-TTIs) in a physical uplink shared channel (PUSCH) in the unlicensed spectrum. The processor circuitry is configured to generate a downlink control information (DCI) to include the scheduled multi-TTIs and a hybrid automatic repeat and request acknowl-
(Continued)

edgement (HARQACK) assessment information associated with the scheduled multi-TTIs. The radio front end circuitry is configured to transmit the DCI to a user equipment (UE) over the unlicensed spectrum.

20 Claims, 16 Drawing Sheets

(51) Int. Cl.
*H04L 1/1812* (2023.01)
*H04L 1/1867* (2023.01)

(56) References Cited

U.S. PATENT DOCUMENTS

| | | |
|---|---|---|
| 2018/0279358 A1 | 9/2018 | Babaei et al. |
| 2020/0120668 A1* | 4/2020 | Lee ................ H04W 72/542 |
| 2021/0328728 A1* | 10/2021 | El Hamss ............ H04L 5/0091 |

OTHER PUBLICATIONS

Written Opinion dated Aug. 5, 2020, for PCT Appl. No. PCT/US2020/013253, 7 pages.

Interdigital Inc, "Configured Grant Enhancements in NR-U," 3GPP Draft, R1-1811207 Configured Grant Enhancements in NR-U, 3rd Generation Partnership Project (3GPP), Mobile Competence Centre, 650 Route Des Lucioles, F-06921 Sophia-Antipolis Cedex, France, vol. RAN WG1, No. Chengdu, China, Oct. 8, 2018-Oct. 12, 2018, Sep. 29, 2018, 5 pages.

Motorola Mobility et al., "Feature lead summary for NR-U DL Signals and Channels," 3GPP Draft, R1-1811911, 3rd Generation Partnership Project (3GPP), Mobile Competence Centre, 650 Route Des Lucioles, F-06921 Sophia-Antipolis Cedex, France, vol. RAN WG1, No. Chengdu, China, Oct. 8, 2018-Oct. 12, 2018, Oct. 10, 2018, 17 pages.

Huawei, HiSilicon, "HARQ enhancements in NR unlicensed," 3GPP TSG RAN WG1 Meeting #94, R1-1808063, Aug. 20, 2018; 8 pages.

Chinese Office Action directed to Chinese Patent Application No. 202080008697.0, mailed Feb. 1, 2024; 11 pages.

\* cited by examiner

GRANT BASED PUSCH TRANSMISSION AND CONFIGURED GRANT BASED PUSCH TRANSMISSION IN NR SYSTEMS OPERATING ON UNLICENSED SPECTRUM

CROSS REFERENCE TO RELATED APPLICATIONS

This application is a U.S. National Phase of International Application No, PCT/US2020/013253, filed Jan. 11, 2020, which claims the benefit of U.S. Provisional Application No. 62/791,701, filed Jan. 11, 2019, both of which are hereby incorporated by reference in their entireties.

BACKGROUND

Various embodiments generally may relate to the field of wireless communications.

BRIEF SUMMARY

The summary provides a brief description of one or more of embodiments and/or examples found within this disclosure.

This disclosure describes an access point (AP), or an apparatus thereof, of a wireless communication on an unlicensed spectrum. The AP includes processor circuitry configured to schedule multiple transmission time intervals (multi-TTIs) in a physical uplink shared channel (PUSCH) in the unlicensed spectrum. The processor circuitry is configured to generate the DCI to include the scheduled multi-TTIs and a hybrid automatic repeat and request acknowledgement (HARQ-ACK) assessment information associated with the scheduled multi-TTIs. The AP includes a radio front end circuitry configured to transmit the DCI to a user equipment (UE) device over the unlicensed spectrum. In embodiments, the PUSCH is a grant based PUSCH (GB PUSCH) or a configured grant based PUSCH (CG PUSCH).

This disclosure also describes a method being performed by an access point of a wireless communication system on an unlicensed spectrum. The method includes scheduling multiple transmission time intervals (multi-TTIs) physical uplink shared channel (PUSCH) in the unlicensed spectrum. The method includes generating a downlink control information (DCI) to include the scheduled multi-TTIs and a hybrid automatic repeat request acknowledgement (HARQ-ACK) assessment information associated with the scheduled multi-TTIs, and transmitting, from the AP to a user equipment (UE), the DCI over the unlicensed spectrum. In embodiments, the PUSCH is a grant based PUSCH (GB PUSCH) or a configured grant based PUSCH (CG PUSCH).

This disclosure also describes computer-readable media (CRM) including computer instructions to be executed by one or more processors of an access point (AP) of a wireless communication system on an unlicensed spectrum. The computer instructions cause the one or more processors to schedule multiple transmission time intervals (multi-TTIs) physical uplink shared channel (PUSCH) in the unlicensed spectrum. The instructions cause the one or more processors to generate a downlink control information (DCI) to include the scheduled multi-TTIs and a hybrid automatic repeat request acknowledgement (HARQ-ACK) assessment information associated with the scheduled multi-TTIs, and transmit the DCI to a user equipment (UE) over the unlicensed spectrum. In embodiments, the PUSCH is a grant based PUSCH (GB PUSCH) or a configured grant based PUSCH (CG PUSCH).

DETAILED DESCRIPTION

Figure 1:
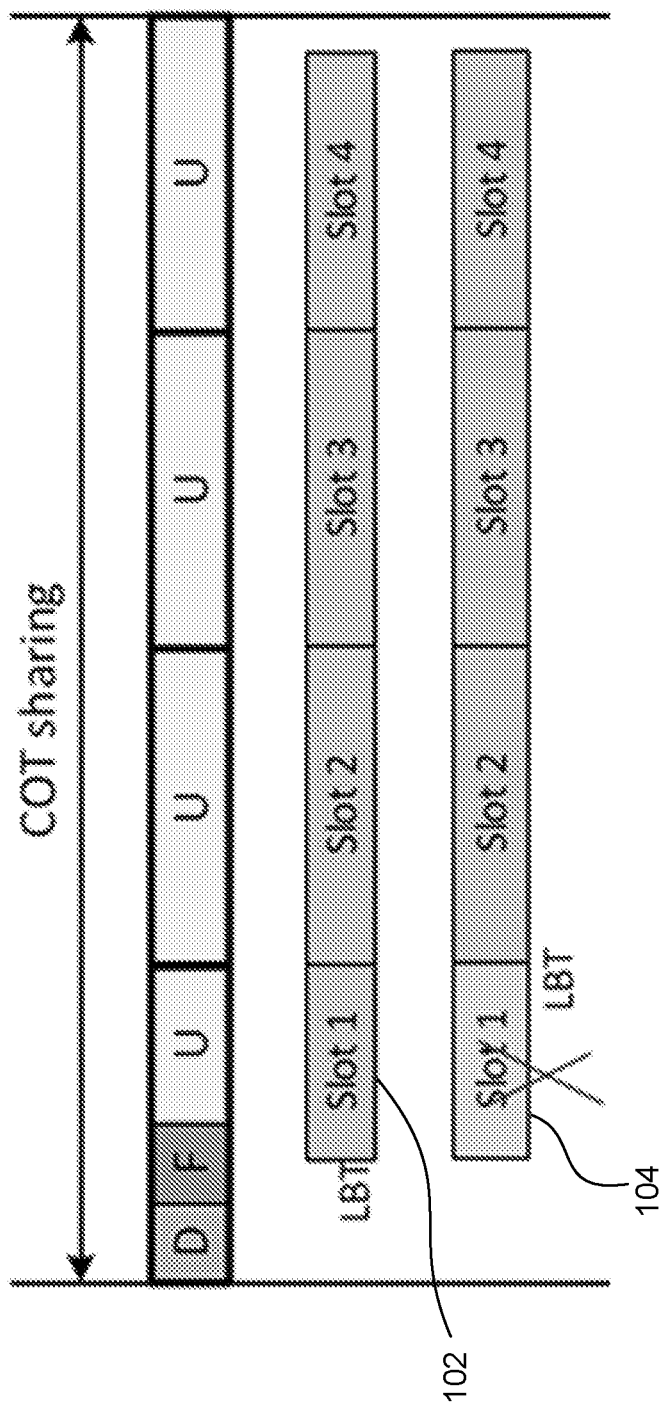
FIG. 1 depicts an example of time resource of multi-slot physical uplink shared channel (PUSCH) in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of LTE. In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, a natural enhancement is to allow this to also operate on unlicensed spectrum. The work to introduce shared/unlicensed spectrum in 5G NR has already been kicked off, and a new work item on "NR-Based Access to Unlicensed Spectrum" was approved in TSG RAN Meeting #82. One objective of this new WI:

Physical layer aspects including RAN1:
Frame structure including single and multiple DL to UL and UL to DL switching points within a shared COT with associated identified LBT requirements (TR Section 7.2.1.3.1).
UL data channel including extension of PUSCH to support PRB-based frequency block-interlaced transmission; support of multiple PUSCH(s) starting positions in one or multiple slot(s) depending on the LBT outcome with the understanding that the ending position is indicated by the UL grant; design not requiring the UE to change a granted TBS for a PUSCH transmission depending on the LBT outcome. The necessary PUSCH enhancements based on CP-OFDM. Applicability of sub-PRB frequency block-interlaced transmission for 60 kHz to be decided by RAN1.
Physical layer procedure(s) including RAN1, and RAN2:
For LBT, channel access mechanism in line with agreements from the NR-U study item (TR 38.889, Section 7.2.1.3.1). Specification work to be performed by RAN1.
HARQ operation: NR HARQ feedback mechanisms are the baseline for NR-U operation with extensions in line with agreements during the study phase (NR-U TR section 7.2.1.3.3), including immediate transmission of HARQ A/N for the corresponding data in the same shared COT as well as transmission of HARQ A/N in a subsequent COT. Potentially support mechanisms to provide multiple and/or supplemental time and/or frequency domain transmission opportunities. (RAN1)
Scheduling multiple transmission time intervals (TTIs) for PUSCH in-line with agreements from the study phase (TR 38.889, Section 7.2.1.3.3). (RAN1)
Configured Grant operation: NR Type-1 and Type-2 configured grant mechanisms are the baseline for NR-U operation with modifications in line with agreements during the study phase (NR-U TR section 7.2.1.3.4). (RAN1)
Data multiplexing aspects (for both UL and DL) considering LBT and channel access priorities. (RAN1/RAN2)

One of the challenges in this case is that this system must maintain fair coexistence with other incumbent technologies, and in order to do so depending on the particular band in which it might operate some restriction might be taken into account when designing this system. For instance, if operating in the 5 GHz band, a listen before talk (LBT) procedure needs to be performed to acquire the medium before a transmission can occur. Grant based PUSCH (GB PUSCH) and configured grant based PUSCH (CG PUSCH) could exist in the same cell. Proper handling of such two kinds of transmission schemes is critical for efficient cell operation, especially considering GB multi-transmission time interval (TTI) transmission and CG PUSCH with repetitions. In order to overcome the issues, this disclosure provides details on the design of GB PUSCH transmission and also CG PUSCH transmission of NR in order to allow an efficient way to operate in unlicensed spectrum.

In a NR system operating on unlicensed spectrum, since a transmission is conditional to the success of the LBT procedure, the impact of LBT on PUSCH transmission should be minimized. GB PUSCH could be prioritized over CG PUSCH. DCI format scheduling multi-TTI PUSCH is designed considering overhead and blind detection. DFI overhead to be minimized considering CBG based CG PUSCH transmission.

DCI Formats for Single-TTI/Multi-TTI PUSCH

NR-U will support scheduling multiple TTIs for PUSCH, i.e., scheduling multiple TBs with different HARQ process IDs over multiple slots, using a single UL grant. Based on the two DCI format 0_0 and 0_1 defined in NR Rel-15, new DCI formats scheduling multi-TTI PUSCH can be designed. Due to the regulation limitation on occupied channel bandwidth (OCB), the PUSCH resource allocation will be redesigned compared to Rel-15, which is not the focus of this disclosure. Frequency resource allocation field(s) in a DCI is likely to be changed which results in different DCI from DCI 0_0 and 0_1. Frequency resource allocation field(s) in a DCI can follow whatever designed for frequency resource allocation in NR-U. Throughout this section, single-TTI scheduling means the scheduling of single TB, while, multi-TTI scheduling means the scheduling of multiple TBs.

In some embodiments, two new DCI formats are derived based on DCI 0_0, denoted as DCI 0_0A and 0_0B, which support single-TTI scheduling and multi-TTI scheduling, respectively. Two new DCI formats are derived based on DCI 0_1, denoted as DCI 0_1A and 0_1B, which support single-TTI scheduling and multi-TTI scheduling, respectively.

In some embodiments, only one new DCI format is derived based on DCI 0_0, denoted as DCI 0_0A, which supports single-TTI scheduling. Two new DCI formats are derived based on DCI 0_1, denoted as DCI 0_1A and 0_1B, which support single-TTI scheduling and multi-TTI scheduling, respectively. In fact, DCI 0_0 is fallback DCI and mainly for robustness of transmission, it may not need to be extended for the support of multi-TTI transmission.

In some embodiments, only one new DCI format is derived based on DCI 0_0, denoted as DCI 0_0A, which supports single-TTI scheduling. Only one new DCI format is derived based on DCI 0_1, denoted as DCI 0_1C, which supports dynamic switching between single-TTI scheduling and multi-TTI scheduling.

In some embodiments, for the abovementioned DCI format 0_0B, 0_1B or 0_1C, at least some of the following fields are needed:
New data indicator (NDI) per transport block (TB).
Redundancy version (RV) per TB, 1 or 2 bits can be considered.
A single HARQ process number h, e.g., the single number h is assigned to the first TB, while the $k^{th}$ TB use HARQ process number h+k, h=0, 1, . . . , N−1, N is number of TB predefined or configured for the multi-TTI PUSCH.
Channel access type, can be NO LBT, an aggressive LBT e.g. one shot LBT with 25 μs, or a conservative LBT, e.g. CAT-4 LBT. NO LBT means direct transmission without LBT with a gap smaller than e.g. 16μs.

Channel access priority class, e.g. 2 bits as defined in LTE LAA.

Number of scheduled slots, the maximum number of scheduled slots can be predefined or configured by RRC signaling. If both DCI 0_1A and 0_1B are used, DCI 0_1B could indicate number of scheduled slot from 2 to N; for DCI 0_1C, the number of scheduled slot ranges from 1 to N, N is number of TBs predefined or configured in the multi-TTI PUSCH.

Start position of PUSCH, e.g. LTE LAA supports 4 start positions, i.e. start of OS 0, 25 μs after start of OS 0, 25 μs+TA after start of OS 0 and start of OS 1. Values will be defined for NR-U. In one embodiment, the start position of PUSCH is OS X, OS X+25 μs, OS X+25 μs+TA, and OS X+1, where X is the start symbol, which can be indicated in a different field.

Start symbol index and end symbol index of the time resource. These two information can be signaled separately or jointly coded.

CBGTI, it exists if CBG based transmission is configured.

Indication of whether COT sharing is allowed or not for a CG UE: in one embodiment this field might be composed by one bit, and indicate only whether COT sharing is enabled or disabled; in another embodiment, this field might be composed by ⅔ bits and indicate the length of the available shared COT, so that a CG UE might evaluate in advance whether to transmit in the shared COT or not, since in one embodiment a CG UE is only allowed to perform a transmission within the shared COT only if enough data to utilize those time-domain resources available.

In some embodiments, channel access field in DCI 0_0A or 0_0B is 1 bit, and channel access field in DCI 0_1A, 0_1B or 0_1C is 2 bits. Channel access field in DCI 0_0A or 0_0B indicates NO LBT or one-shot LBT, while channel access field in DCI 0_1A, 0_1B or 0_1C indicates NO LBT, one-shot LBT or CAT-4 LBT. In one embodiment, channel access field is one bit for all DCI formats 0_0A, 0_0B, 0_1A, 0_1B or 0_1C, and the two states indicated by the field are configured by RRC signaling. In one embodiment, the channel access field in DCI 0_0A is 2 bits, indicating NO LBT, one-shot LBT or CAT-4 LBT.

In some embodiments, both DCI 0_1A and 0_1B are used, and the two DCI formats have different sizes. CBGTI of DCI 0_1A is S bits, which is used to indicate whether/which CBG(s) are transmitted for the one TB. CBGTI of DCI 0_1B is M bits per TB, assuming there are totally N TBs in the multi-TTI PUSCH, total number of CBGTI bits is MN bits. S, M and/or N can be predefined or configured by RRC signaling. Normally MN is much larger than S. To limited size of DCI 0_1B, the maximum value of M could be reduced compared to S. For example, S could be 2, 4, or 8, while M could be 2 or 4.

In some embodiments, a TB scheduled by DCI 0_1A cannot be rescheduled by DCI 0_1B, a TB scheduled by DCI 0_1B cannot be rescheduled by DCI 0_1A. In one embodiment, any DCI formats including DCI 0_1A, 0_1B and others can be used to schedule any transmission or retransmission of a TB. Specifically, number of CBGTI bits is S and M for DCI 0_1A and DCI 0_1B, respectively. S is normally larger and M. For a TB scheduled by DCI 0_1A in one transmission while scheduled by DCI 0_1B in another transmission, one issue is how to interpret CBGTI in the two DCI formats. Assuming S>M, the S CBGs for the TB are grouped into M CBG groups. Each CBG group uses one CBGTI bit for the TB in DCI 0_1B. In one embodiment, a CBG with index k is grouped into CBG group mod(k,M), k=0, 1 . . . S−1. If a CBGTI bit for a TB in DCI 0_1B is ACK, it means all CBGs for a TB in the CBG group corresponding to the CBGTI bit is rescheduled. Alternatively, a TB could be first divided into M CBGs which applies to DCI 0_1B, then each of the M CBGs is divided into ceil(S/M) or floor(S/M) subgroups. Each subgroup then uses one CBGTI bit for the TB in DCI 0_1A. In one embodiment, CBG with index k from the M CBGs is divided into ceil(S/M) subgroups if k<mod(k,M), ceil(S/M) otherwise, k=0, 1 . . . M−1. If a CBGTI bit for a TB in DCI 0_1A is ACK, it means the subgroup of the corresponding CBG for the TB corresponding to the CBGTI bit is rescheduled.

In some embodiments, DCI 0_1C is used which supports dynamic switching between single-TTI scheduling and multi-TTI scheduling. CBGTI of DCI 0_1C is M bits per TB, assuming there are totally N TBs in the multi-TTI PUSCH, total number CBGTI bits is MN bits. When less than N TBs are scheduled, the number of CBGs per TB could be larger than M.

In some embodiments, in case only single TB is scheduled by DCI 0_1C, still only M CBG bits are used for the TB. In this case, there is no need for special handling of CBG grouping.

In some embodiments, in case only single TB is scheduled by DCI 0_1C, S CBGTI bits from the MN bits, S>M could be used for the TB. In this case, a TB could be first divided into S CBGs, which applies to single-TTI scheduling, then the S CBGs are grouped into M CBG groups. Each CBG group uses one CBGTI bit for the TB in multi-TTI scheduling.

In some embodiments, CBG with index k is grouped into CBG group mod(k,M), k=0, 1 . . . S−1. If a CBGTI bit for a TB in multi-TTI scheduling is ACK, it means all CBGs in the CBG group for the TB corresponding to the CBGTI bit is rescheduled. By way of non-limiting example, a TB could be first divided into M CBGs which applies to multi-TTI scheduling, then each of the M CBGs is divided into ceil(S/M) or floor(S/M) subgroups. Each subgroup then uses one CBGTI bit for the TB in single-TTI scheduling.

In some embodiments, CBG with index k from the M CBGs is divided into ceil(S/M) subgroups if k<mod(k,M), ceil(S/M) otherwise, k=0, 1 . . . M−1. If a CBGTI bit for a TB in single-TTI scheduling is ACK, it means the subgroup of the corresponding CBG for the TB corresponding to the CBGTI bit is rescheduled.

In some embodiments, when n TBs are scheduled by DCI 0_1C, n<N, the MN bits of CBGTI are reallocated to the n TBs. T=MN/n or T=min(MN/n, S) bits of CBGTI could be allocated to one TB. S is the maximum number of CBG used for a TB. A TB could be first divided into S CBGs, then the S CBGs are grouped into T CBG groups. CBG with index k is grouped into CBG group mod(k,T), k=0, 1 . . . S−1. A CBG group maps to one CBGTI bit.

In some embodiments, DCI 0_1C, in case only single TB is scheduled, RV of 2 bits is used by the TB; otherwise, RV is 1 bit per TB.

In some embodiments, if CBG based transmission is not configured, only one DCI format, i.e. DCI 0_1C is used to dynamically switch between single-TTI scheduling and multi-TTI scheduling, otherwise, two DCI format 0_1A and 0_1B are both used.

HARQ Feedback Using DFI

In FeLAA AUL, DFI is introduced to indicate HARQ-ACK for the PUSCH. One HARQ-ACK bit is transmitted for each TB in the DFI. However, such scheme may result in quite large overhead since NR-U configured grant based PUSCH could support CBG based transmission. In worst case, assuming 16 HARQ processes for CG, and each TB has 8 CBGs, 128 bits should be carried in DFI.

In some embodiments, N HARQ-ACK bits are allocated for each HARQ process configured for CG, while only 1 bit is allocated for other HARQ processes. N is a predefined or configured number by RRC signaling. N could be configured by same signaling of the configured number of CBG for a TB, or N could be configured by a separate RRC signaling. The 1 bit for a HARQ processes not configured for CG is not used to trigger transmission or retransmission of a grant based PUSCH, but could be an information used in CWS adjustment. That means, even grant based PUSCH is also CBG based, still only 1 bit is allocated in DFI for overhead reduction.

In some embodiments, DFI in NR-U could match to the size of a DCI with larger size, e.g. DCI 0_1B or 0_1C. Specifically, DFI in NR-U could match to the size of a DL DCI with larger size.

In some embodiments, all HARQ processes for GB and CG PUSCH could be divided into X subset, X>1. Each subset of HARQ processes maps to a separate DFI. By this way, the size of a DFI is reduced.

In some embodiments, HARQ processes configured for CG could be divided into X subsets, X>1. Each subset of HARQ processes maps to a separate DFI. In a DFI, for the corresponding subset of HARQ process configured for CG, N HARQ-ACK bits are allocated for each HARQ process. While, for all other HARQ processes not belonging to this subset, no matter it is configured for CG or not, 1 bit HARQ-ACK per HARQ process is included. N is a predefined or configured number by RRC signaling. N be configured by same signaling of the configured number of CBG for a TB, or N could be configured by a separate RRC signaling. The 1 bit per HARQ process could be an information used in CWS adjustment. For a HARQ processes configured for CG, it is up to UE whether it refers this 1 bit for the new transmission or retransmission. For example, assuming this 1 bit per HARQ process is generated as NACK if at least one CBG is erroneous, UE could stop the ongoing repetition PUSCH transmission of the related HARQ process if this 1 bit is ACK.

In some embodiments, CBG grouping could be applied to reduce number of HARQ-ACK bits for each HARQ process configured for CG. Assuming configured number of CBG is S for a TB, and S CBGs needs to be grouped into N CBG groups. N is a predefined or configured number by RRC signaling. N be configured by same signaling of the configured number of CBG for a TB, or N could be configured by a separate RRC signaling. Assuming number of CBGTI bits per TB is different for single-TTI scheduling and multi-TTI scheduling, N could equal to the smaller number of CBGTI bits per TB between single-TTI scheduling and multi-TTI scheduling. One HARQ-ACK bit for each CBG group is included in DFI. Preferably, CBG with index k is grouped into CBG group mod(k, N), k=0, 1 . . . S−1. If one bit for a CBG group of a TB is ACK in DFI, it means ACK for all CBGs in the CBG group, otherwise, a bundled NACK is signalled by DFI for the CBGs in the CBG group.

Time Resource of Multi-Slot PUSCH

In NR-U, a UE cannot always get the channel when a PUSCH is triggered due to limitation of LBT. Consequently, a method reducing the attempts of LBT could be beneficial.

In some embodiments, for a grant based multi-slot PUSCH, once UE occupied the channel by successfully performing a LBT in a slot 102, UE could transmit continuously in multiple slots. Assuming information on a start symbol index and an end symbol index is indicated, these two information can be signaled separately or jointly coded. As shown in FIG. 1, in the first slot for the channel occupation, UE should follow the start symbol indicated, while the last symbol in the first slot is last symbol of the slot, i.e., symbol 13. In the last slot for the channel occupation, UE should follow the end symbol indicated, while the first symbol in the last slot is symbol 0. For any middle slot(s) if existed, they are starting from symbol 0 and ending at symbol 13.

In some embodiments, as shown in FIG. 1, if UE fails to pass LBT in a slot 104, the UE has to try LBT again in the next slot. Preferably, as shown in FIG. 1, UE could try LBT at symbol 0 of the next slot.

In some embodiments, within a slot a UE can attempt to perform LBT in multiple occasions, e.g., a UE can attempt LBT in symbol 0, 7 as follows: if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot.

In some embodiments, a UE can be configured to attempt LBT on different occasions through DCI signaling or higher layer signaling.

In some embodiments, a UE might be configured to start on a specific starting position, which is not necessarily at the slot boundary.

Figure 2:
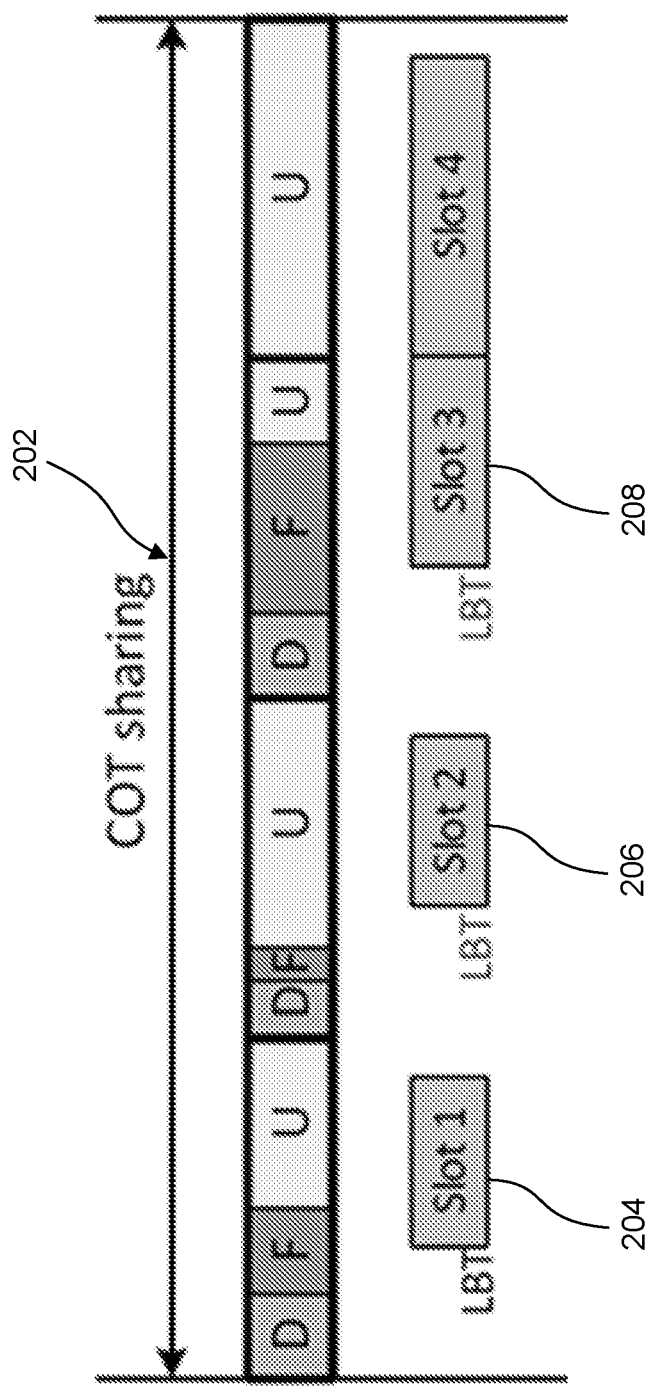
FIG. 2 depicts an example of time resource of configured grant (CG) PUSCH in accordance with some embodiments.

As shown in FIG. 2, inside a gNB's initiated shared COT 202 with multiple DL to UL and UL to DL switching points, the UL symbols are actually not continuous. In some embodiments, as shown in FIG. 2, for a grant based multi-slot PUSCH, in the first slot of the multi-slot PUSCH in a shared UL burst, the start symbol in the first slot is determined by the start symbol indicated by DCI. In case the next few slot are also full uplink slot, UE can continue uplink transmission in the consecutive uplink slots. In the last slot of the multi-slot PUCH in a shared UL burst, UE has to stop PUSCH transmission at the end symbol indicated by DCI.

In some embodiments, if UE fails to pass LBT in a slot 204, the UE has to try LBT again in the next slot(s) 206, 208. Preferably, as shown in FIG. 2, UE could try LBT at symbol 0 of the next slot if the next slot is full uplink slot.

In some embodiments, within the shared COT 202 of the gNB, the UE can attempt to perform LBT in multiple occasions within the shared resources, e.g., a UE can attempt LBT in symbol 0, 7 of each shared slots: such that if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot. This same process can be applied to all the remaining UL slots within a shared COT.

In some embodiments, a UE can be configured to attempt LBT on different occasions through DCI signaling or higher layer signaling. In some embodiments, a UE might be configured to start on a specific starting position, which is not necessarily at the slot boundary.

Notice that the above concepts can be equally applicable also in the case of multiple DL/UL switching points.

Time Resource of CG PUSCH

In NR-U, a UE cannot always get the channel when a PUSCH is triggered due to limitation of LBT. Consequently, a method reducing the attempts of LBT is required.

Figure 3:
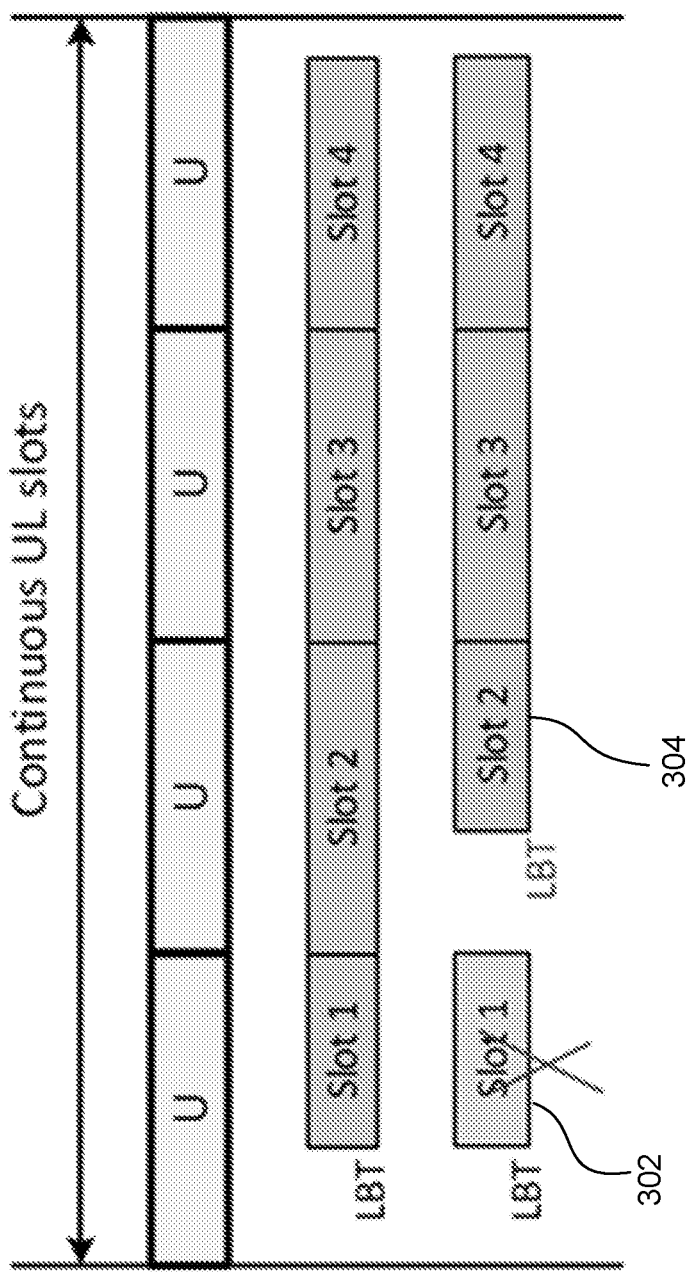
FIG. 3 depicts another example of time resource of CG PUSCH in accordance with some embodiments.

In some embodiments, assuming high layer configures the slots for configured grant based PUSCH (CG PUSCH), e.g.

there could be a N-bit bitmap. A slot mapped to a '1' in the bitmap could be used for CG PUSCH transmission. Again, it is preferred to allow UE to transmit continuously in multiple slots mapped by value '1' in the bitmap, once UE occupied the channel by successfully performing a LBT. Assuming information on a start symbol index and an end symbol index is indicated or configured, these two information can be signaled separately or jointly coded. As shown in FIG. 3, In the first slot for the channel occupation, UE should follow the start symbol indicated or configured, while the last symbol in the first slot is last symbol of the slot, i.e. symbol 13. In the last slot for the channel occupation, UE should follow the end symbol indicated or configured, while the first symbol in the last slot is symbol 0. For any middle slot(s) if existed, they are starting from symbol 0 and end at symbol 13.

In some embodiments, if UE fails to pass LBT in a slot 302, the UE has to try LBT again in the next slot 304. Preferably, as shown in FIG. 3, UE could again try LBT following the start symbol indicated or configured.

Figure 4:
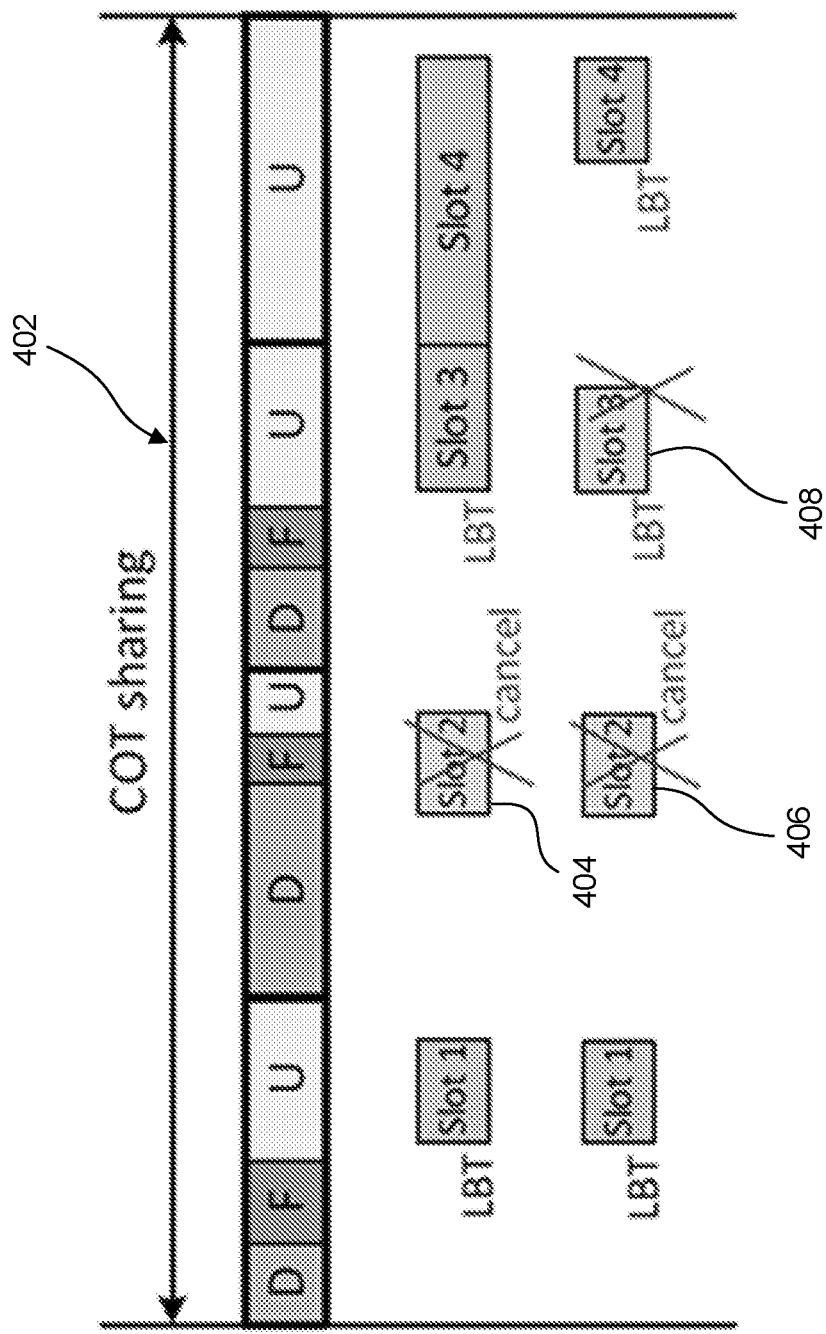
FIG. 4 depicts another example of time resource of CG PUSCH in accordance with some embodiments.

Inside a gNB-initiated shared COT with multiple DL to UL and UL to DL switching points, the UL symbols are actually not continuous. In some embodiments, if CG PUSCH is allowed inside COT 402, as shown in FIG. 4, in the first slot of CG PUSCH in a shared UL burst, the start symbol in the first slot is determined by the start symbol indicated or configured. In case the next few slot are full uplink slots, UE can continue uplink transmission of CG PUSCH in the consecutive uplink slots. In the last slot of CG PUSCH in a shared UL burst, UE has to stop PUSCH transmission at the end symbol indicated or configured.

In some embodiments, if UE fails to pass LBT in a slot(s) 404, 406, and/or 408, the UE has to try LBT again in the next slot. Preferably, as shown in FIG. 4, UE could again try LBT following the start symbol indicated or configured.

In some embodiments, if UE is scheduled a multi-slot PUSCH inside shared COT with multiple DL to UL and UL to DL switching points, and if UE is indicated as NO LBT, UE could do NO LBT to start its transmission in each UL burst used by this multi-slot PUSCH. By way of non-limiting example, UE only does NO LBT in the exactly first UL burst of the multi-slot PUSCH, and UE will try 25 μs LBT in other UL burst. Alternatively, UE does NO LBT in the exactly first burst of the multi-slot PUSCH, for other UL burst, if the start symbol of the multi-slot PUSCH is indicated as flexible symbol by DCI 2_0, UE could still do NO LBT, otherwise, if it is indicated as uplink symbol by DC 2_0, UE does 25 μs LBT. By way of non-limiting example, UE does NO LBT in the exactly first burst of the multi-slot PUSCH, for other UL burst, if the start symbol of the multi-slot PUSCH is indicated as flexible symbol by DCI 2_0 or is the first uplink symbol indicated by DCI 2_0, UE could still do NO LBT, otherwise, if it is after the first uplink symbol indicated by DCI 2_0, UE does 25 μs LBT. Alternatively, UE does NO LBT in the exactly first burst of the multi-slot PUSCH, for other UL burst, if the start symbol of the multi-slot PUSCH follows a downlink symbol or flexible symbol as indicated by DCI 2_0, UE could still do NO LBT, otherwise, UE does 25 μs LBT. If UE fails passing LBT in the first slot of a UL burst of the multi-slot PUSCH, UE always does 25 μs in the following slots in the UL burst.

Figure 5:
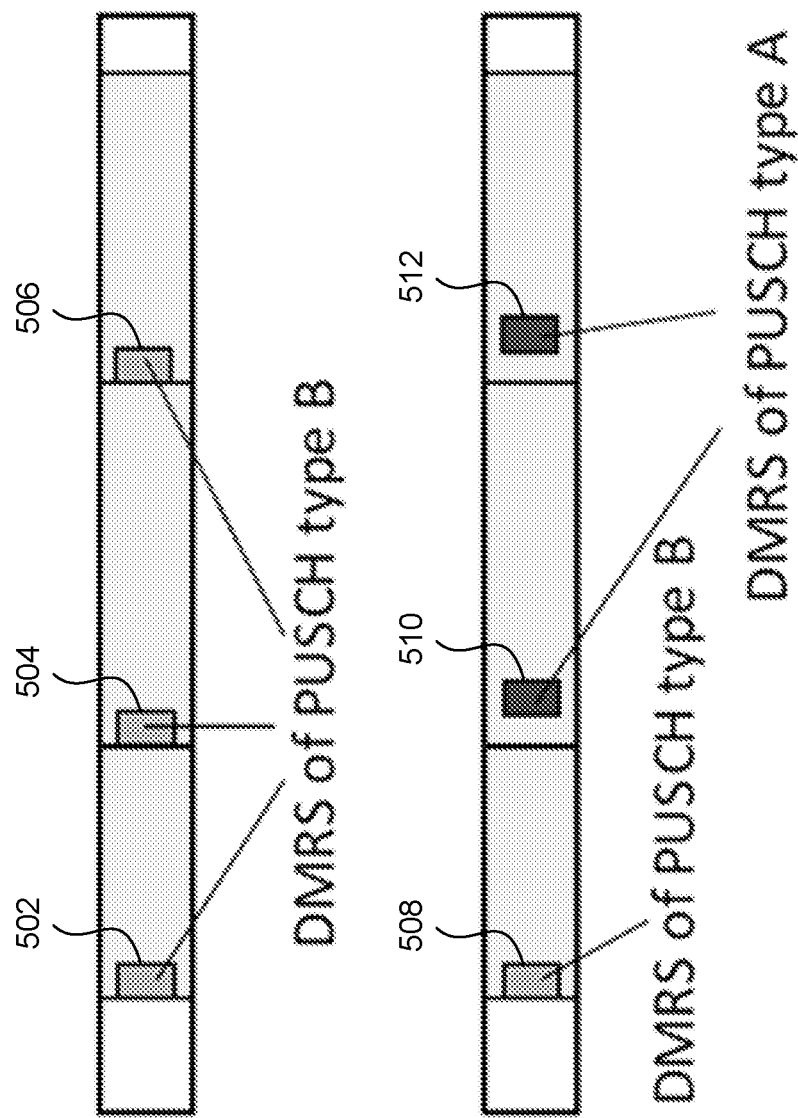
FIG. 5 depicts an example of demodulation reference signal (DMRS) in consecutive uplink (UL) slots in accordance with some embodiments.

In some embodiments, DMRS pattern in a slot of multi-slot PUSCH follows the PUSCH type indicated by DCI format. That is, as shown in FIG. 5, DMRS 502, 504, 506 always start from the first symbol in a slot. Specifically, full slot is used by the PUSCH and is treated as PUSCH type B.

In some embodiments, as shown in FIG. 5, DMRS pattern 508 in a first slot follows the PUSCH type indicated by DCI format, while DMRS 510, 512 in remaining slot follows PUSCH type A.

In some embodiments, CSI is prioritized to be piggybacked on a last slot of a multi-slot PUSCH if the PUSCH in the slot is actually available for transmission. For example, PUSCH in a slot may be canceled due to e.g. confliction of symbol direction between the PUSCH in the slot and a flexible symbol indicated by DCI 2_0. Due to LBT, the probability of availability of a last slot of multi-slot PUSCH is higher than an earlier slot. If the a last slot is not available for transmission, its previous slot is checked for the transmission of CSI piggybacked on PUSCH. If the multi-slot PUSCH is separated into multiple shared UL burst, CSI could be piggybacked on a last slot of a shared UL burst with maximum number of slots.

In some embodiments, if NO LBT is used to schedule a multi-slot PUSCH, CSI is piggybacked on the exactly first slot of the multi-slot PUSCH.

Rate Matching and Reception for CG PUSCH

In NR-U, a TB can be repeated multiple times. In one embodiment, the CG-UCI is piggybacked only in the first slot repetition of a TB. In one embodiment, the CG-UCI is piggybacked in each slot. In one embodiment, the multiple slot repetitions of a TB may map to more than one UL bursts, CG-UCI is piggybacked in beginning slot repetition of a TB on each UL burst. Multiple reasons may cause the slots repetitions in different UL burst. Value '1' in the high layer configured bitmap may be not continuous, so that slot assigned to CG PUSCH is not continuous. In a shared COT with multiple DL/UL switching points, this could have multiple separated shared UL bursts.

In some embodiments, the data transmission is rate matched around the CG-UCI. In one embodiment, UCI is contained in each slot, and per each slot the RV is specified. In one embodiment, if UCI is contained only in the first slot of a burst of repeated slots, the UCI contains indication of the RV used for the first slot, while for the other slot the legacy sequence is followed starting from the RV indicated in the UCI: e.g. if UCI indicated RV=0, then next RV will be 2 3 1 0 2 3 1.

In some embodiments, a different sequence is used. In one embodiment, the number of repetitions within a COT is upper bounded by the length of MCOT or in case of shared COT by the remaining shared COT. In one embodiment, if UCI is contained only in the first slot of a burst of repeated slots, rate matching (RM) is done according to the total number of available REs for CG PUSCH in the set of repeated slots. In details, the UCI contains indication of a RV which points to a start position in the circular buffer for RM, and the number of bits read out is determined by the total number of REs.

In some embodiments, a CG UE can perform LBT in multiple positions within a slot. A CG UE can attempt LBT as an example in symbol 0, 7 as follows: if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot. In one embodiment, UCI is always carried in the second part of a slot, for example in symbol 10, 11, and 12.

In some embodiments, a CG UE can be configured to attempt LBT on different occasions through the activation/deactivation DCI or through higher layer signaling.

In some embodiments, a CG UE might be configured to start always on a specific starting position, which is not necessarily at the slot boundary.

In some embodiments, a UE can transmit the UCI only in the first slot of N contiguous slots within the MCOT, and rate match the TB over the N contiguous slots. In one embodiment, the rate matched transmission can be repeated M times. In one embodiment, N and M are both RRC configured.

In some embodiments, if time-domain repetitions are allowed for CG, and UCI is only carried in the first repetitions, then CG-UCI carries information related to the number of time-domain repetitions performed.

In some embodiments, for the multiple slot repetition of a TB, UE does rate matching of the TB assuming the total number of REs of N slots. The N slots could be contiguous in time or could be separated by other slots not configured for CG, e.g., by the high layer configured bitmap. Further, each of the N slot can be a full uplink slot or only part of the slot is used as uplink. The rate matching operation is repeated M times so that the total number of slot repetition for the TB is MN. N and M are both RRC configured.

Start Positions of GB PUSCH and CG PUSCH

In LTE LAA, a GB PUSCH can start from one of four possible start position as indicated by DCI, i.e. start of OS 0, start 25 μs after start of OS 0, start 25 μs+TA after start of OS 0 and start of OS 1. In NR-U, potential start positions could be dependent on the numerology of PUSCH. NR supports both PUSCH type A and PUSCH type B. DMRS for PUSCH type B is always located in the first symbol of PUSCH resource, which is to reduce gNB processing time. While PUSCH type A starts from symbol 0 and DMRS is in symbol 2 or 3. The position of DMRS in a PUSCH should also be considered in the choice of start positions.

In the following description, it is assumed that the start symbol of SLIV is in symbol k.

In some embodiments, start position of PUSCH is determined as an offset X on symbol k, i.e. "start of symbol k+offset X". By this way, start position is at start of symbol k or after that. For PUSCH type A, k equals to 0, it is beneficial to limit potential values of X to be earlier than first DMRS symbol. For PUSCH type B, DMRS has to be shifted right after a start position. The shift of DMRS can be UE specific so that DMRS is the first whole UL symbol after start position. Alternatively, the shifted DMRS can be determined by the largest X to align DMRS timing in a cell.

For example, possible values of X are provided in Table 1. If 25 μs LBT is indicated, UE could follow X=25 μs or 25 μs+TA; while if NO LBT is indicated, UE could follow X=16 μs or 16 μs+TA. For SCS 15 kHz and PUSCH type A, it achieves the same behavior as LTE LAA. For SCS 15 kHz and PUSCH type B, DMRS symbol could be shifted right by at least one symbol. For SCS 30 kHz, it still could generate four start positions in single symbol with shorter reservation signal. For value X=25 μs+TA, TA is UE's timing advance, the round trip delay could be about 10 μs if limiting the start position in one symbol, which is sufficiently large for NR-U operation. For value X=16 μs+TA, the supported round-trip delay is even larger. Again, DMRS symbol could shifted right by at least one symbol. For SCS 60 kHz, at least 2 symbols are required to generate a gap for 25 μs LBT. If X equals to 0, PUSCH can start from symbol k; if X equal to 16 μs, PUSCH start from symbol k+1; if X equals to 16 μs+TA, PUSCH may start from symbol k+1 or k+2 depending on X; while for other start positions, PUSCH may start from symbol k+2. For PUSCH type B, DMRS symbol could be shifted right by one or two symbols depending on X, or always shifted right by 2 symbols.

TABLE 1

Offset X determining start positions

| 2-bit field | 00 | 01 | 10 | 11 |
|---|---|---|---|---|
| X | 0 | 25 μs (16 μs) | 25 μs + TA (16 μs + TA) | +1 symbol |

By way of non-limiting example, possible values of X are provided in Table 2. The interval between largest X and smallest X is fixed, e.g. equal to 1 symbol with 15 kHz SCS. For SCS 15 kHz and PUSCH type B, DMRS symbol could be shifted right by at least one symbol. For SCS 30 kHz, the largest X is of 2 symbols. For PUSCH type B, DMRS symbol could be shifted right by one or two symbols depending on X, or always shifted right by 2 symbols. For SCS 60 kHz, the largest X is of 4 symbols. For PUSCH type A, DMRS symbol could be shifted right by zero or two symbols depending on X, or always shifted right by 2 symbols. For PUSCH type B, DMRS symbol could be shifted right by two or four symbols depending on X, or always shifted right by 4 symbols.

TABLE 2

Offset X determining start positions

| 2-bit field | 00 | 01 | 10 | 11 |
|---|---|---|---|---|
| X | 0 | 25 μs(16 μs) | 25 μs + TA (16 μs + TA) | +1 symbol (15 kHz) +2 symbols (30 kHz) +4 symbols (60 kHz) |

In some embodiments, start position of PUSCH is determined as an offset X on symbol k−1 or k−2 or k−4, i.e. "start of symbol k−a+offset X, a=1 or 2 or 4". By this way, start position is no later than the start symbol of symbol k. For PUSCH type B, the start positions are always no later than the start symbol of PUSCH so that DMRS symbol position is not changed.

For example, possible values of X are provided in Table 1. It is up to gNB scheduling to guarantee the period doing CCA before the start symbol of PUSCH. For PUSCH type B, X=0 is not used so that PUSCH can start from its first symbol k, not k−1 or k−2. For SCS 15 kHz and 30 kHz, a equal to 1 is used. For SCS 60 kHz, a equals to 2 is used if 25 μs LBT is indicated. a could equal to 1 if NO LBT is indicated. If TA is relatively large, still a equal 2 is needed for NO LBT.

By way of non-limiting example, possible values of X are provided in Table 2. For SCS 15 kHz, a equal to 1; for SCS 30 kHz, a equals to 2; for SCS 60 kHz, a equals to 4. However, there could be a whole UL symbol before symbol k. such UL symbol could just transmit filling signal or the actual start symbol of PUSCH is shifted to the earliest whole UL symbol. Alternatively, the start positions resulting in whole UL symbol before symbol k is not applicable.

In some embodiments, possible values of X are provided as shown in Table 2. For PUSCH type A, a equal to 0 for SCS 15 kHz; a equal to 0 for SCS 30 kHz; a equal to 2 for SCS 60 kHz. For SCS 60 kHz, PUSCH will start from symbol k+2 with largest value X that is the earliest symbol for DMRS; hence no special handling on DMRS is needed. for SCS 60 kHz and X=0, the start symbol is k−2, filling signal could be transmitted, or X=0 is not applicable. For PUSCH type B, a equal to 1 for SCS 15 kHz, DMRS symbol position is not changed; a equal to 1 for SCS 30 kHz, PUSCH will start from symbol k+1 with largest value X, so DMRS symbol should be shifted right by 1 symbol; a equal to 2 for SCS 60 kHz, PUSCH will start from symbol k+2 with largest value X, so DMRS symbol should be shifted right by 2 symbols. For PUSCH type B, X=0 is not used so that PUSCH can start from its first symbol k at earliest.

In some embodiments, the potential start positions are generated within 1 or 2 symbols. If CG PUSCH occupies full bandwidth and is outside a gNB-initiated COT, potential start positions are generated within 1 symbol for SCS 15 kHz and 30 kHz, and within 2 symbols for SCS 60 kHz. For SCS 15 kHz, offset X could be 16 µs, 25 µs, 34 µs, 43 µs, 52 µs, 61 µs, 1 symbol; For SCS 30 kHz, offset X could be 16, 25, 1 symbol; For SCS 60 kHz, offset X could be 16, 25, 2 symbols. Alternatively, for SCS 60 kHz, offset X could be fixed to 2 symbols. If CG PUSCH occupies full bandwidth and is inside a gNB-initiated COT, only those start positions with X larger than 25 µs are supported. For SCS 15 kHz, offset X could be 34, 43, 52, 61, 1 symbol; for SCS 30 kHz, offset X could be 1 symbol; for SCS 60 kHz, offset X could be 2 symbols. if PUSCH type B, offset X for SCS 30 kHz and 60 kHz could make it just start from the its first symbol of PUSCH. Alternatively, only those start positions with X larger than 16 µs are supported since GB PUSCH could be prioritized scheduled with NO LBT. If CG PUSCH occupies not all interlaces of frequency resources, exact value X can be high layer configured.

In some embodiments, the potential start positions are always generated within 1 symbol duration of SCS 15 kHz. If CG PUSCH occupies full bandwidth and is outside a gNB-initiated COT, potential start position offset X within 1 symbol for SCS 15 kHz could be 16, 25, 34, 43, 52, 61, 1 symbol. The same X values apply to SCS 30 kHz and 60 kHz as well. If CG PUSCH occupies full bandwidth and is inside a gNB-initiated COT, only those start positions with X larger than 25 µs are supported, i.e., offset X could be 34, 43, 52, 61, 1 symbol. Alternatively, only those start positions with X larger than 16 µs are supported since GB PUSCH could be prioritized scheduled with NO LBT, i.e., offset X could be 25, 34, 43, 52, 61, 1 symbol. If CG PUSCH occupies not all interlaces of frequency resources, exact value X can be high layer configured.

In some embodiments, for 15 KHz subcarrier spacing and for CG PUSCH occupying full bandwidth or partial bandwidth and performing transmission inside the gNB's COT, the following starting positions are allowed: 16, 25, 34, 43, 52, 61, 1 symbol. For 30 KHz subcarrier spacing and for CG PUSCH occupying full bandwidth or partial bandwidth and performing transmission inside the gNB's COT, the following starting positions are allowed: 16, 25, 1 symbol. For 60 KHz subcarrier spacing and for CG PUSCH occupying full bandwidth or partial bandwidth and performing transmission inside the gNB's COT, the first N symbols can be used as a starting position starting.

In some embodiments, for 15 KHz subcarrier spacing and for CG PUSCH occupying full bandwidth or partial bandwidth and performing transmission outside of the gNB's COT, the following starting positions are allowed: 34, 43, 52, 61, 1 symbol. For 30 KHz subcarrier spacing and for CG PUSCH occupying full bandwidth or partial bandwidth and performing transmission inside the gNB's COT, the following starting positions are allowed: $1^{st}$ symbol+16 µs, $1^{st}$ symbol+25 µs, $2^{nd}$ symbol. For 60 KHz subcarrier spacing and for CG PUSCH occupying full bandwidth or partial bandwidth and performing transmission inside the gNB's COT, the first N symbols can be used as a starting position starting from the $2^{nd}$ symbol.

In some embodiments, one table of SLIV is configured for potential time domain resources. For a GB PUSCH, UE just follows the start symbol indicated by each row of the table as start symbol of GB PUSCH. While for CG PUSCH, an additional offset b is added to the start symbol indicated by a row of the table. By way of non-liming example, start symbol is indicated as k by a row, then start symbol of CG PUSCH is exactly symbol k+b. By this way, even the same set of start position offset X is used, it still gives GB PUSCH the priority over CG PUSCH. In on embodiment, a separated table of SLIV could configured CG PUSCH from GB PUSCH. By this way, it is possible to manage the SLIV in the table for CG PUSCH make it is lower prioritized than GB PUSCH.

In some embodiments, within a gNB-initiated shared COT, NO LBT could be indicated in DCI for GB PUSCH, however, only 25 µs LBT is used for CG PUSCH if CG PUSCH inside COT is allowed. This method gives priority to GB PUSCH. Once GB PUSCH is not transmitted or the signal of GB PUSCH is not strong enough to make CCA of CG PUSCH fails, CG PUSCH still be transmitted.

Systems and Implementations

Figure 6:
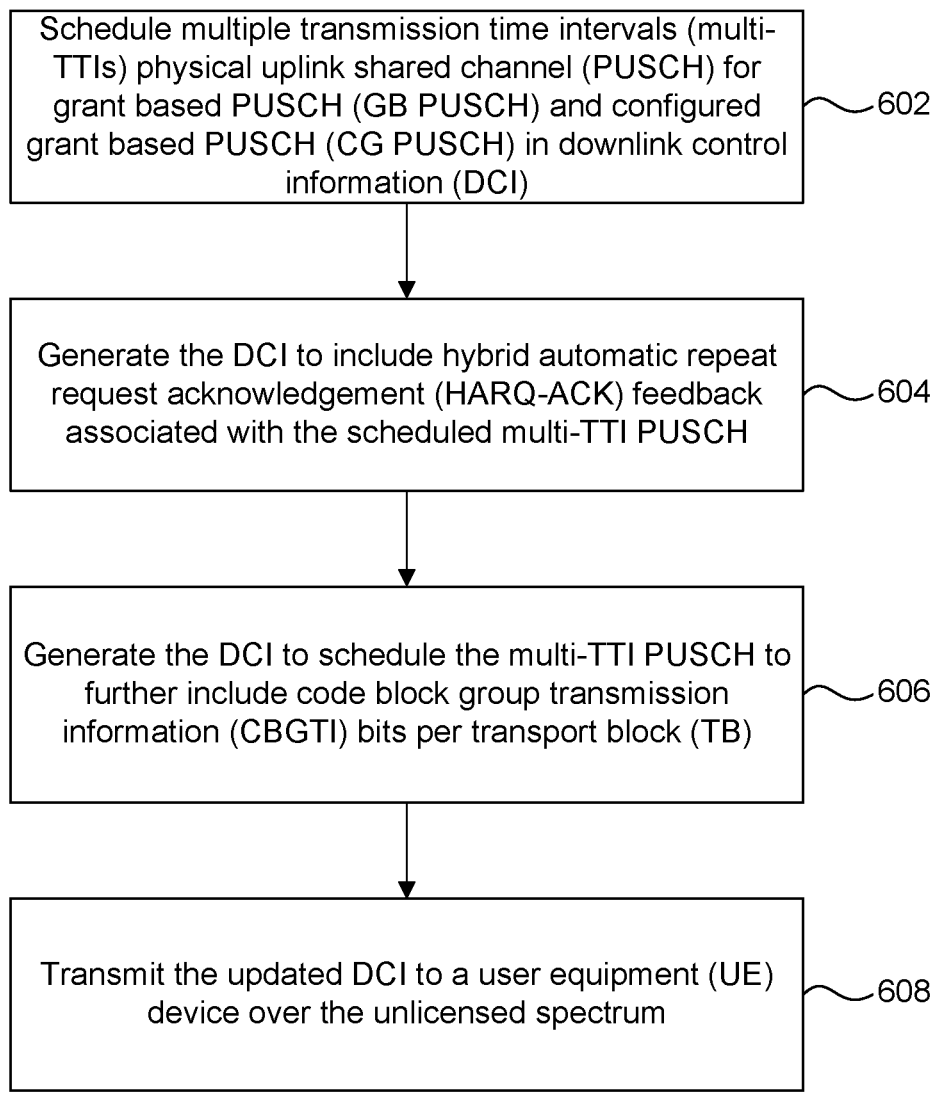
FIG. 6 depicts an example procedure in accordance with some embodiments.

FIG. 6 illustrates an example procedure, in accordance with some embodiments. The example procedure may be executed in a system of apparatus as described herein with respect to FIG. 7 through 16. In accordance with some embodiments, at step 602, an access point (AP) schedules multiple transmission time intervals (multi-TTIs) physical uplink shared channel (PUSCH) transmission for grant based PUSCH (GB PUSCH) and configured grant based PUSCH (CG PUSCH) in downlink control information (DCI). As described above, multi-TTI scheduling means the scheduling of multiple TBs.

In accordance with some embodiments, at step 604, the AP updates the DCI to include hybrid automatic repeat and request acknowledgment (HARQ-ACK) assessment information or HARQ-ACK feedback associated with the schedule multi-TTI PUSCH. In accordance with some embodiments, at step 606, the DCI with the scheduled multi-TTI PUSCH may be further updated by the AP to include code block group transmission information (CBGTI) bits per transport block. The CBGTI bits per TB for multi-TTI PUSCH are different from the CBGTI bits to schedule single-TTI PUSCH.

In accordance with some embodiments, at step 608, the AP may transmit the updated DCI to a user equipment (UE) device over an unlicensed spectrum.

Figure 7:
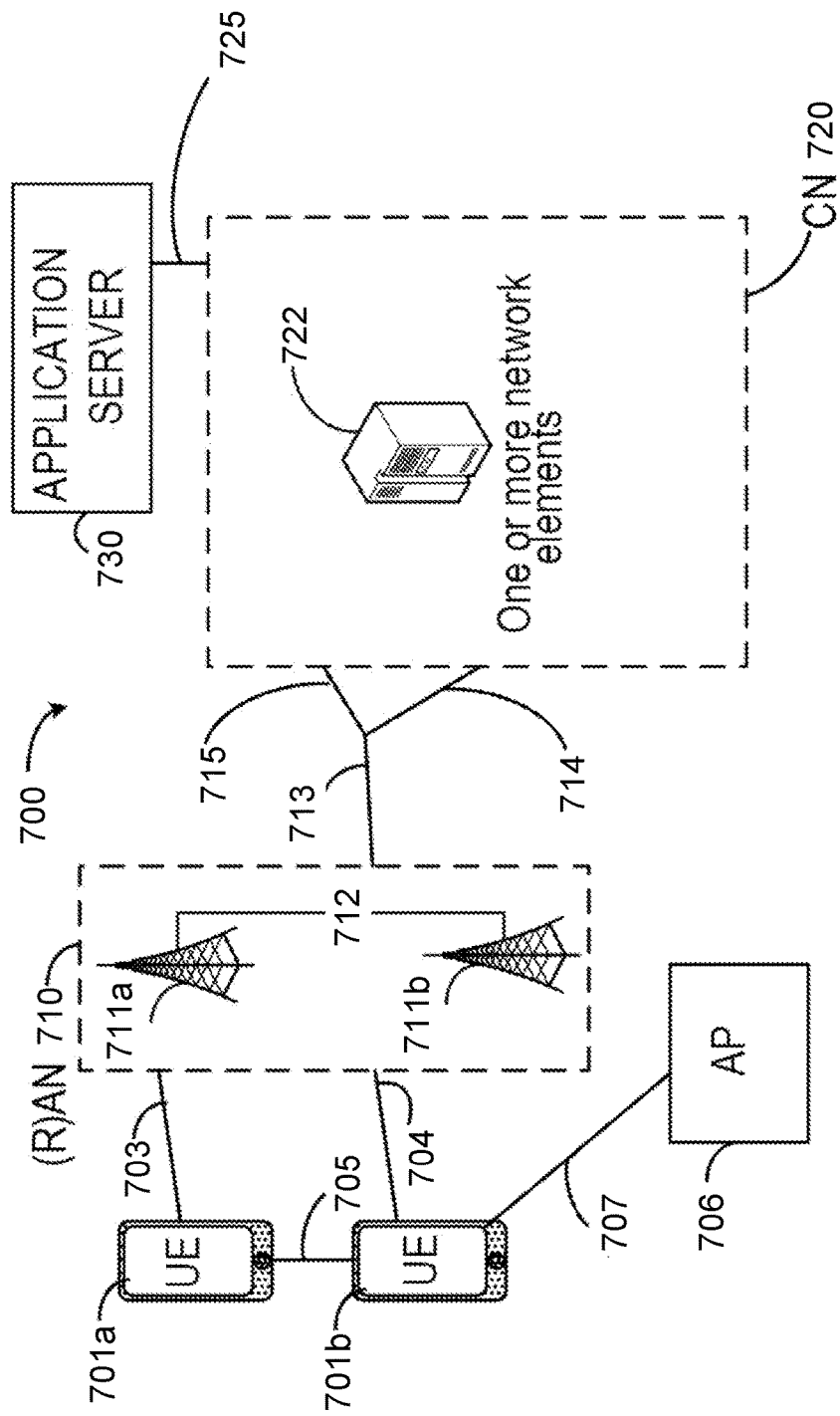
FIG. 7 depicts an architecture of a system of a network in accordance with some embodiments.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively coupled, with a RAN 710. In some embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In some embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNB s, RAN nodes, eNB s, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., FIG. 10), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC (e.g., CN 920 of FIG. 9) via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In some embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701, 702 and the RAN nodes 711, 712 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701, 702 and the RAN nodes 711, 712 may operate using LAA, eLAA, and/or feLAA mechanisms. In these implementations, the UEs 701, 702 and the RAN nodes 711, 712 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701, 702, RAN nodes 711, 712, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701 or 702, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701, 702 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701b within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In some embodiments where the system 700 is an LTE system (e.g., when CN 720 is an EPC 820 as in FIG. 8), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In some embodiments where the system 700 is a 5G or NR system (e.g., when CN 720 is an 5GC 920 as in FIG. 9), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In some embodiments, the CN 720 may be a 5GC (referred to as "5GC 720" or the like), and the RAN 710 may be connected with the CN 720 via an NG interface 713. In some embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs. Embodiments where the CN 720 is a 5GC 720 are discussed in more detail with regard to FIG. 9.

In some embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In some embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMES. An example architecture wherein the CN 720 is an EPC 720 is shown by FIG. 8.

Figure 8:
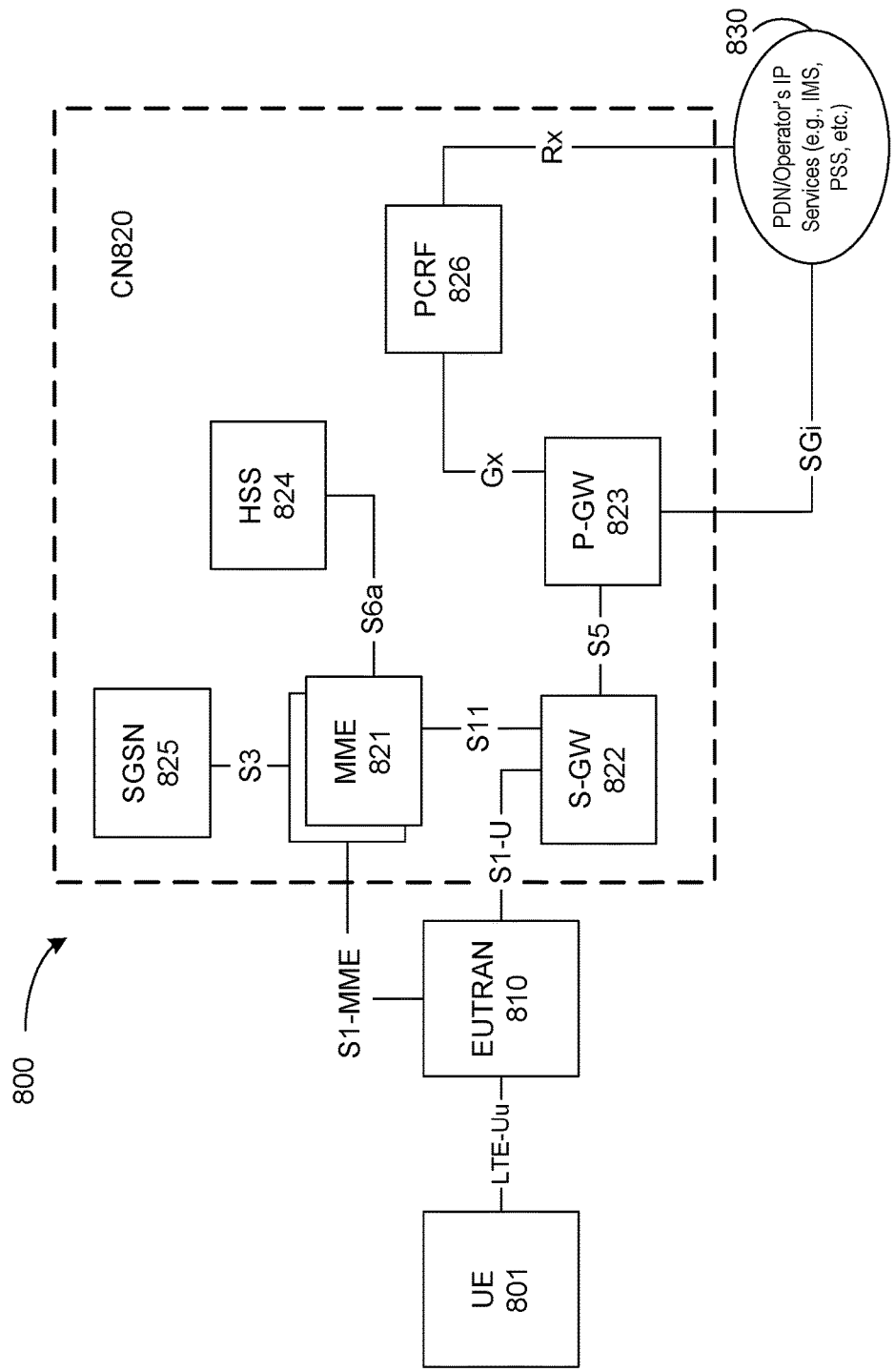
FIG. 8 depicts an architecture of a system including a first core network in accordance with some embodiments.

FIG. 8 illustrates an example architecture of a system 800 including a first CN 820, in accordance with various embodiments. In this example, system 800 may implement the LTE standard wherein the CN 820 is an EPC 820 that corresponds with CN 720 of FIG. 7. Additionally, the UE 801 may be the same or similar as the UEs 701 of FIG. 7, and the E-UTRAN 810 may be a RAN that is the same or similar to the RAN 710 of FIG. 7, and which may include RAN nodes 711 discussed previously. The CN 820 may comprise MMES 821, an S-GW 822, a P-GW 823, a HSS 824, and a SGSN 825.

The MMES 821 may be similar in function to the control plane of legacy SGSN, and may implement MM functions to keep track of the current location of a UE 801. The MMES 821 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 801, provide user identity confidentiality, and/or perform other like services to users/subscribers. Each UE 801 and the MME 821 may include an MM or EMM sublayer, and an MM context may be established in the UE 801 and the MME 821 when an attach procedure is successfully completed. The MM context may be a data structure or database object that stores MM-related information of the UE 801. The MMES 821 may be coupled with the HSS 824 via an S6a reference point, coupled with the SGSN 825 via an S3 reference point, and coupled with the S-GW 822 via an S11 reference point. The SGSN 825 may be a node that serves the UE 801 by tracking the location of an individual UE 801 and performing security functions. In addition, the SGSN 825 may perform Inter-EPC node signaling for mobility between 2G/3G and E-UTRAN 3GPP access networks; PDN and S-GW selection as specified by the MMEs 821; handling of UE 801 time zone functions as specified by the MMEs 821; and MME selection for handovers to E-UTRAN 3GPP access network. The S3 reference point between the MMEs 821 and the SGSN 825 may enable user and bearer information exchange for inter-3GPP access network mobility in idle and/or active states.

The HSS 824 may comprise a database for network users, including subscription-related information to support the network entities' handling of communication sessions. The EPC 820 may comprise one or several HSSs 824, depending on the number of mobile subscribers, on the capacity of the equipment, on the organization of the network, etc. For example, the HSS 824 can provide support for routing/roaming, authentication, authorization, naming/addressing resolution, location dependencies, etc. An S6a reference point between the HSS 824 and the MMEs 821 may enable transfer of subscription and authentication data for authenticating/authorizing user access to the EPC 820 between HSS 824 and the MMEs 821.

The S-GW 822 may terminate the S1 interface 713 ("S1-U" in FIG. 8) toward the RAN 810, and routes data packets between the RAN 810 and the EPC 820. In addition, the S-GW 822 may be a local mobility anchor point for inter-RAN node handovers and also may provide an anchor for inter-3GPP mobility. Other responsibilities may include lawful intercept, charging, and some policy enforcement. The S11 reference point between the S-GW 822 and the MMEs 821 may provide a control plane between the MMEs 821 and the S-GW 822. The S-GW 822 may be coupled with the P-GW 823 via an S5 reference point.

The P-GW 823 may terminate an SGi interface toward a PDN 830. The P-GW 823 may route data packets between the EPC 820 and external networks such as a network including the application server 730 (alternatively referred to as an "AF") via an IP interface 725 (see e.g., FIG. 7). In some embodiments, the P-GW 823 may be communicatively coupled to an application server (application server 730 of FIG. 7 or PDN 830 in FIG. 8) via an IP communications interface 725 (see, e.g., FIG. 7). The S5 reference point between the P-GW 823 and the S-GW 822 may provide user plane tunneling and tunnel management between the P-GW 823 and the S-GW 822. The S5 reference point may also be used for S-GW 822 relocation due to UE 801 mobility and if the S-GW 822 needs to connect to a non-collocated P-GW 823 for the required PDN connectivity. The P-GW 823 may further include a node for policy enforcement and charging data collection (e.g., PCEF (not shown)). Additionally, the SGi reference point between the P-GW 823 and the packet data network (PDN) 830 may be an operator external public, a private PDN, or an intra operator packet data network, for example, for provision of IMS services. The P-GW 823 may be coupled with a PCRF 826 via a Gx reference point.

PCRF 826 is the policy and charging control element of the EPC 820. In a non-roaming scenario, there may be a single PCRF 826 in the Home Public Land Mobile Network (HPLMN) associated with a UE 801's Internet Protocol Connectivity Access Network (IP-CAN) session. In a roaming scenario with local breakout of traffic, there may be two PCRFs associated with a UE 801's IP-CAN session, a Home PCRF (H-PCRF) within an HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate QoS and charging parameters. The PCRF 826 may provision this rule into a PCEF (not shown) with the appropriate TFT and QCI, which commences the QoS and charging as specified by the application server 830. The Gx reference point between the PCRF 826 and the P-GW 823 may allow for the transfer of QoS policy and charging rules from the PCRF 826 to PCEF in the P-GW 823. An Rx reference point may reside between the PDN 830 (or "AF 830") and the PCRF 826.

Figure 9:
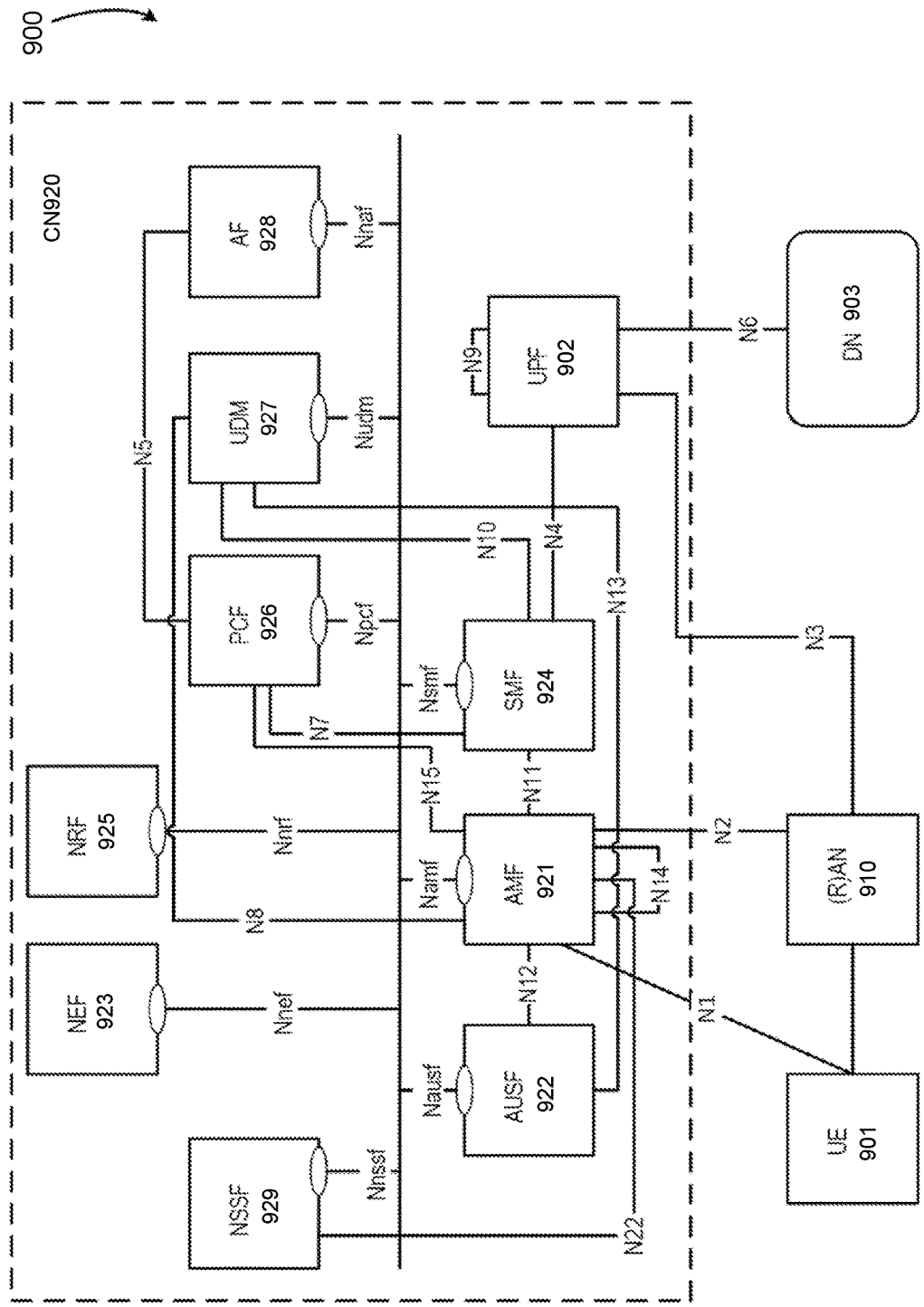
FIG. 9 depicts an architecture of a system including a second core network in accordance with some embodiments.

FIG. 9 illustrates an architecture of a system 900 including a second CN 920 in accordance with various embodiments. The system 900 is shown to include a UE 901, which may be the same or similar to the UEs 701 and UE 801 discussed previously; a (R)AN 910, which may be the same or similar to the RAN 710 and RAN 810 discussed previously, and which may include RAN nodes 711 discussed previously; and a DN 903, which may be, for example, operator services, Internet access or 3rd party services; and a 5GC 920. The 5GC 920 may include an AUSF 922; an AMF 921; a SMF 924; a NEF 923; a PCF 926; a NRF 925; a UDM 927; an AF 928; a UPF 902; and a NSSF 929.

The UPF 902 may act as an anchor point for intra-RAT and inter-RAT mobility, an external PDU session point of interconnect to DN 903, and a branching point to support multi-homed PDU session. The UPF 902 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 902 may include an uplink classifier to support routing traffic flows to a data network. The DN 903 may represent various network operator services, Internet access, or third party services. DN 903 may include, or be similar to, application server 730 discussed previously. The UPF 902 may interact with the SMF 924 via an N4 reference point between the SMF 924 and the UPF 902.

The AUSF 922 may store data for authentication of UE 901 and handle authentication-related functionality. The AUSF 922 may facilitate a common authentication framework for various access types. The AUSF 922 may communicate with the AMF 921 via an N12 reference point between the AMF 921 and the AUSF 922; and may communicate with the UDM 927 via an N13 reference point between the UDM 927 and the AUSF 922. Additionally, the AUSF 922 may exhibit an Nausf service-based interface.

The AMF 921 may be responsible for registration management (e.g., for registering UE 901, etc.), connection management, reachability management, mobility management, and lawful interception of AMF-related events, and access authentication and authorization. The AMF 921 may be a termination point for the an N11 reference point between the AMF 921 and the SMF 924. The AMF 921 may provide transport for SM messages between the UE 901 and the SMF 924, and act as a transparent proxy for routing SM messages. AMF 921 may also provide transport for SMS messages between UE 901 and an SMSF (not shown by FIG. 9). AMF 921 may act as SEAF, which may include interaction with the AUSF 922 and the UE 901, receipt of an intermediate key that was established as a result of the UE 901 authentication process. Where USIM based authentication is used, the AMF 921 may retrieve the security material from the AUSF 922. AMF 921 may also include a SCM function, which receives a key from the SEA that it uses to derive access-network specific keys. Furthermore, AMF 921 may be a termination point of a RAN CP interface, which may include or be an N2 reference point between the (R)AN 910 and the AMF 921; and the AMF 921 may be a termination point of NAS (N1) signalling, and perform NAS ciphering and integrity protection.

AMF 921 may also support NAS signalling with a UE 901 over an N3 IWF interface. The N3IWF may be used to provide access to untrusted entities. N3IWF may be a termination point for the N2 interface between the (R)AN 910 and the AMF 921 for the control plane, and may be a termination point for the N3 reference point between the (R)AN 910 and the UPF 902 for the user plane. As such, the AMF 921 may handle N2 signalling from the SMF 924 and the AMF 921 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 901 and AMF 921 via an N1 reference point between the UE 901 and the AMF 921, and relay uplink and downlink user-plane packets between the UE 901 and UPF 902. The N3IWF also provides mechanisms for IPsec tunnel establishment with the UE 901. The AMF 921 may exhibit an Namf service-based interface, and may be a termination point for an N14 reference point between two AMFs 921 and an N17 reference point between the AMF 921 and a 5G-EIR (not shown by FIG. 9).

The UE 901 may need to register with the AMF 921 in order to receive network services. RM is used to register or deregister the UE 901 with the network (e.g., AMF 921), and establish a UE context in the network (e.g., AMF 921). The UE 901 may operate in an RM-REGISTERED state or an RM-DEREGISTERED state. In the RM-DEREGISTERED state, the UE 901 is not registered with the network, and the UE context in AMF 921 holds no valid location or routing information for the UE 901 so the UE 901 is not reachable by the AMF 921. In the RM-REGISTERED state, the UE 901 is registered with the network, and the UE context in AMF 921 may hold a valid location or routing information for the UE 901 so the UE 901 is reachable by the AMF 921. In the RM-REGISTERED state, the UE 901 may perform mobility Registration Update procedures, perform periodic Registration Update procedures triggered by expiration of the periodic update timer (e.g., to notify the network that the UE 901 is still active), and perform a Registration Update procedure to update UE capability information or to re-negotiate protocol parameters with the network, among others.

The AMF 921 may store one or more RM contexts for the UE 901, where each RM context is associated with a specific access to the network. The RM context may be a data structure, database object, etc. that indicates or stores, inter alia, a registration state per access type and the periodic update timer. The AMF 921 may also store a 5GC MM context that may be the same or similar to the (E)MM context discussed previously. In various embodiments, the AMF 921 may store a CE mode B Restriction parameter of the UE 901 in an associated MM context or RM context. The AMF 921 may also derive the value, when needed, from the UE's usage setting parameter already stored in the UE context (and/or MM/RM context).

CM may be used to establish and release a signaling connection between the UE 901 and the AMF 921 over the N1 interface. The signaling connection is used to enable NAS signaling exchange between the UE 901 and the CN 920, and comprises both the signaling connection between the UE and the AN (e.g., RRC connection or UE-N3IWF connection for non-3GPP access) and the N2 connection for the UE 901 between the AN (e.g., RAN 910) and the AMF 921. The UE 901 may operate in one of two CM states, CM-IDLE mode or CM-CONNECTED mode. When the UE 901 is operating in the CM-IDLE state/mode, the UE 901 may have no NAS signaling connection established with the AMF 921 over the N1 interface, and there may be (R)AN 910 signaling connection (e.g., N2 and/or N3 connections) for the UE 901. When the UE 901 is operating in the CM-CONNECTED state/mode, the UE 901 may have an established NAS signaling connection with the AMF 921 over the N1 interface, and there may be a (R)AN 910 signaling connection (e.g., N2 and/or N3 connections) for the UE 901. Establishment of an N2 connection between the (R)AN 910 and the AMF 921 may cause the UE 901 to transition from CM-IDLE mode to CM-CONNECTED mode, and the UE 901 may transition from the CM-CONNECTED mode to the CM-IDLE mode when N2 signaling between the (R)AN 910 and the AMF 921 is released.

The SMF 924 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 901 and a data network (DN) 903 identified by a Data Network Name (DNN). PDU sessions may be established upon UE 901 request, modified upon UE 901 and 5GC 920 request, and released upon UE 901 and 5GC 920 request using NAS SM signaling exchanged over the N1 reference point between the UE 901 and the SMF 924. Upon request from an application server, the 5GC 920 may trigger a specific application in the UE 901. In response to receipt of the trigger message, the UE 901 may pass the trigger message (or relevant parts/information of the trigger message) to one or more identified applications in the UE 901. The identified application(s) in the UE 901 may establish a PDU session to a specific DNN. The SMF 924 may check whether the UE 901 requests are compliant with user subscription information associated with the UE 901. In this regard, the SMF 924 may retrieve and/or request to receive update notifications on SMF 924 level subscription data from the UDM 927.

The SMF 924 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 924 may be included in the system 900, which may be between another SMF 924 in a visited network and the SMF 924 in the home network in roaming scenarios. Additionally, the SMF 924 may exhibit the Nsmf service-based interface.

The NEF 923 may provide means for securely exposing the services and capabilities provided by 3GPP network functions for third party, internal exposure/re-exposure, Application Functions (e.g., AF 928), edge computing or fog computing systems, etc. In such embodiments, the NEF 923 may authenticate, authorize, and/or throttle the AFs. NEF 923 may also translate information exchanged with the AF 928 and information exchanged with internal network functions. For example, the NEF 923 may translate between an AF-Service-Identifier and an internal 5GC information. NEF 923 may also receive information from other network functions (NFs) based on exposed capabilities of other network functions. This information may be stored at the NEF 923 as structured data, or at a data storage NF using standardized interfaces. The stored information can then be re-exposed by the NEF 923 to other NFs and AFs, and/or used for other purposes such as analytics. Additionally, the NEF 923 may exhibit an Nnef service-based interface.

The NRF 925 may support service discovery functions, receive NF discovery requests from NF instances, and provide the information of the discovered NF instances to the NF instances. NRF 925 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 925 may exhibit the Nnrf service-based interface.

The PCF 926 may provide policy rules to control plane function(s) to enforce them, and may also support unified policy framework to govern network behaviour. The PCF 926 may also implement an FE to access subscription information relevant for policy decisions in a UDR of the UDM 927. The PCF 926 may communicate with the AMF 921 via an N15 reference point between the PCF 926 and the AMF 921, which may include a PCF 926 in a visited network and the AMF 921 in case of roaming scenarios. The PCF 926 may communicate with the AF 928 via an N5 reference point between the PCF 926 and the AF 928; and with the SMF 924 via an N7 reference point between the PCF 926 and the SMF 924. The system 900 and/or CN 920 may also include an N24 reference point between the PCF 926 (in the home network) and a PCF 926 in a visited network. Additionally, the PCF 926 may exhibit an Npcf service-based interface.

The UDM 927 may handle subscription-related information to support the network entities' handling of communication sessions, and may store subscription data of UE 901. For example, subscription data may be communicated between the UDM 927 and the AMF 921 via an N8 reference point between the UDM 927 and the AMF. The UDM 927 may include two parts, an application FE and a UDR (the FE and UDR are not shown by FIG. 9). The UDR may store subscription data and policy data for the UDM 927 and the PCF 926, and/or structured data for exposure and application data (including PFDs for application detection, application request information for multiple UEs 901) for the NEF 923. The Nudr service-based interface may be exhibited by the UDR 221 to allow the UDM 927, PCF 926, and NEF 923 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 924 via an N10 reference point between the UDM 927 and the SMF 924. UDM 927 may also support SMS management, wherein an SMS-FE implements the similar application logic as discussed previously. Additionally, the UDM 927 may exhibit the Nudm service-based interface.

The AF 928 may provide application influence on traffic routing, provide access to the NCE, and interact with the policy framework for policy control. The NCE may be a mechanism that allows the 5GC 920 and AF 928 to provide information to each other via NEF 923, which may be used for edge computing implementations. In such implementations, the network operator and third party services may be hosted close to the UE 901 access point of attachment to achieve an efficient service delivery through the reduced end-to-end latency and load on the transport network. For edge computing implementations, the 5GC may select a UPF 902 close to the UE 901 and execute traffic steering from the UPF 902 to DN 903 via the N6 interface. This may be based on the UE subscription data, UE location, and information provided by the AF 928. In this way, the AF 928 may influence UPF (re)selection and traffic routing. Based on operator deployment, when AF 928 is considered to be a trusted entity, the network operator may permit AF 928 to interact directly with relevant NFs. Additionally, the AF 928 may exhibit an Naf service-based interface.

The NSSF 929 may select a set of network slice instances serving the UE 901. The NSSF 929 may also determine allowed NSSAI and the mapping to the subscribed S-NSSAIs, if needed. The NSSF 929 may also determine the AMF set to be used to serve the UE 901, or a list of candidate AMF(s) 921 based on a suitable configuration and possibly by querying the NRF 925. The selection of a set of network slice instances for the UE 901 may be triggered by the AMF 921 with which the UE 901 is registered by interacting with the NSSF 929, which may lead to a change of AMF 921. The NSSF 929 may interact with the AMF 921 via an N22 reference point between AMF 921 and NSSF 929; and may communicate with another NSSF 929 in a visited network via an N31 reference point (not shown by FIG. 9). Additionally, the NSSF 929 may exhibit an Nnssf service-based interface.

As discussed previously, the CN 920 may include an SMSF, which may be responsible for SMS subscription checking and verification, and relaying SM messages to/from the UE 901 to/from other entities, such as an SMS-GMSC/IWMSC/SMS-router. The SMS may also interact with AMF 921 and UDM 927 for a notification procedure that the UE 901 is available for SMS transfer (e.g., set a UE not reachable flag, and notifying UDM 927 when UE 901 is available for SMS).

The CN 120 may also include other elements that are not shown by FIG. 9, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 9). Individual NFs may share a UDSF for storing their respective unstructured data or individual NFs may each have their own UDSF located at or near the individual NFs. Additionally, the UDSF may exhibit an Nudsf service-based interface (not shown by FIG. 9). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 9 for clarity. In one example, the CN 920 may include an Nx interface, which is an inter-CN interface between the MME (e.g., MME 821) and the AMF 921 in order to enable interworking between CN 920 and CN 820. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 10:
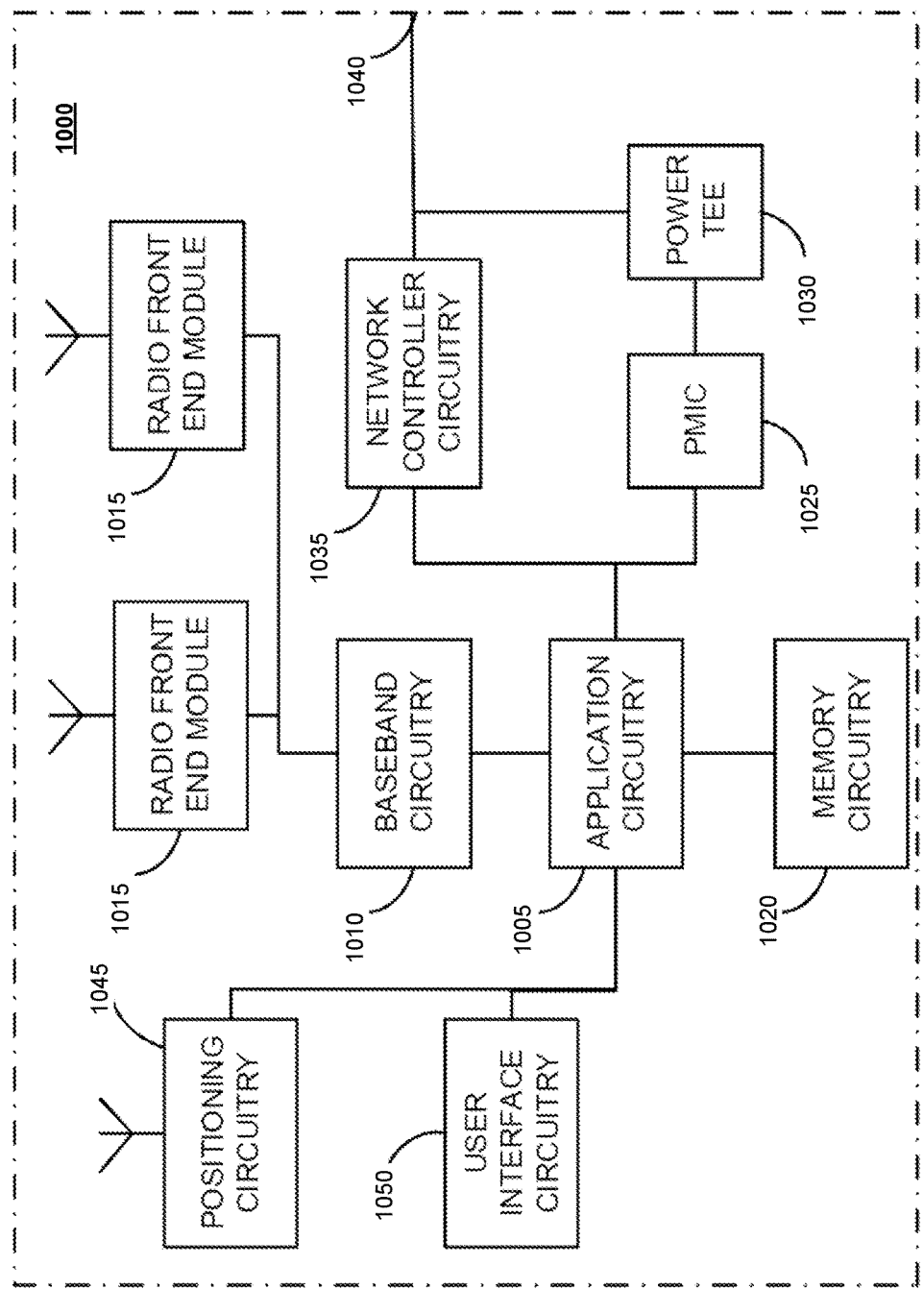
FIG. 10 depicts an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, RAN node such as the RAN nodes 711 and/or AP 706 shown and described previously, application server(s) 730, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (110) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I$_2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 12.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various infrastructure (e.g., RAN nodes 711, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 11:
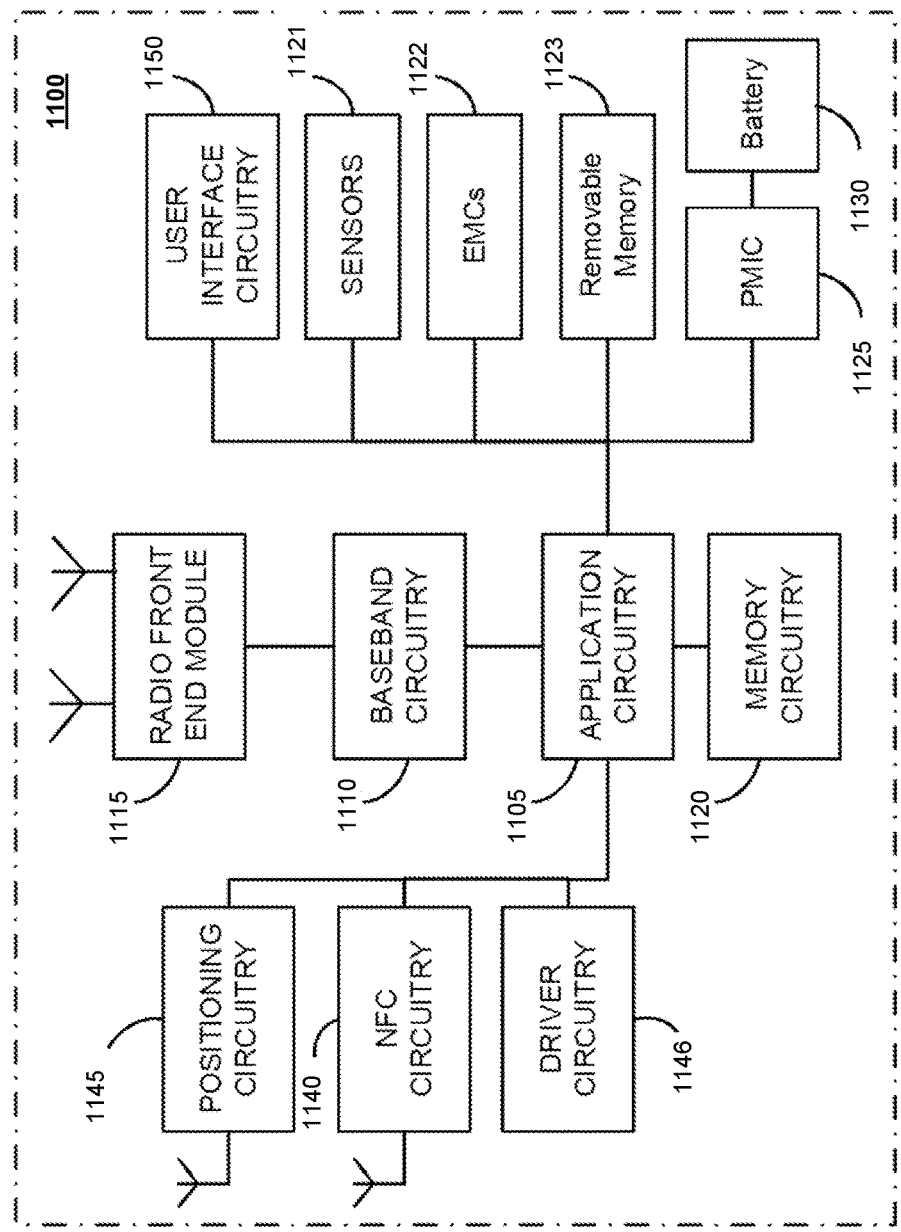
FIG. 11 depicts example components of a platform in accordance with various embodiments.

FIG. 11 illustrates an example of a platform 1100 (or "device 1100") in accordance with various embodiments. In some embodiments, the computer platform 1100 may be suitable for use as UEs 701, 702, 801, application servers 730, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1005 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 12.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signalling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In some embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 1010 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 701, 702, 801.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block XS30 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 12:
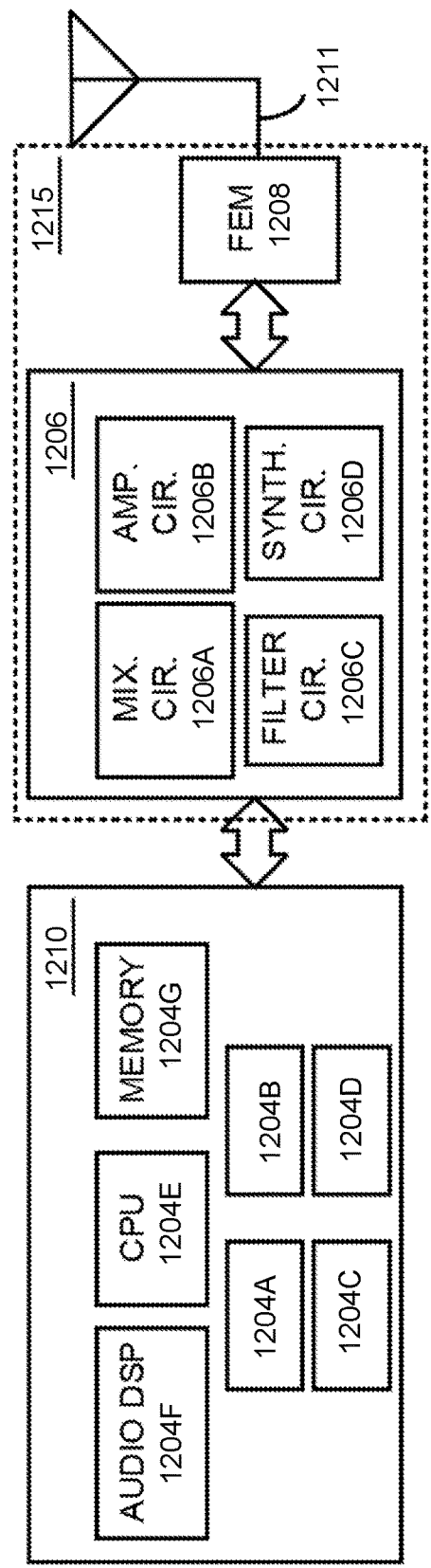
FIG. 12 depicts example components of baseband circuitry and radio frequency circuitry in accordance with some embodiments.

FIG. 12 illustrates example components of baseband circuitry 1210 and radio front end modules (RFEM) 1215 in accordance with various embodiments. The baseband circuitry 1210 corresponds to the baseband circuitry 1010 and 1110 of FIGS. 10 and 11, respectively. The RFEM 1215 corresponds to the RFEM 1015 and 1115 of FIGS. 10 and 11, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 1005/1105 (see FIGS. 10 and 11) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 1005/1105 of FIGS. 10-12); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband circuitry 1210 and RF circuitry 1206 may be implemented together such as, for example, a system on a chip (SoC) or System-in-Package (SiP). In another example, some or all of the constituent components of the baseband circuitry 1210 may be implemented as a separate SoC that is communicatively coupled with and RF circuitry 1206 (or multiple instances of RF circuitry 1206). In yet another example, some or all of the constituent components of the baseband circuitry 1210 and the application circuitry 1005/1105 may be implemented together as individual SoCs mounted to a same circuit board (e.g., a "multi-chip package").

In some embodiments, the baseband circuitry 1210 may provide for communication compatible with one or more radio technologies. For example, in some embodiments, the baseband circuitry 1210 may support communication with an E-UTRAN or other WMAN, a WLAN, a WPAN. Embodiments in which the baseband circuitry 1210 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1210 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a of the transmit signal path may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1005/1105 depending on the desired output frequency. In some embodiments, a divider control input (e.g., N) may be determined from a look-up table based on a channel indicated by the application circuitry 1005/1105.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna) in a variety of shapes, and may be coupled with the RF circuitry 1206 and/or FEM circuitry 1208 using metal transmission lines or the like.

Processors of the application circuitry 1005/1105 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 1005/1105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
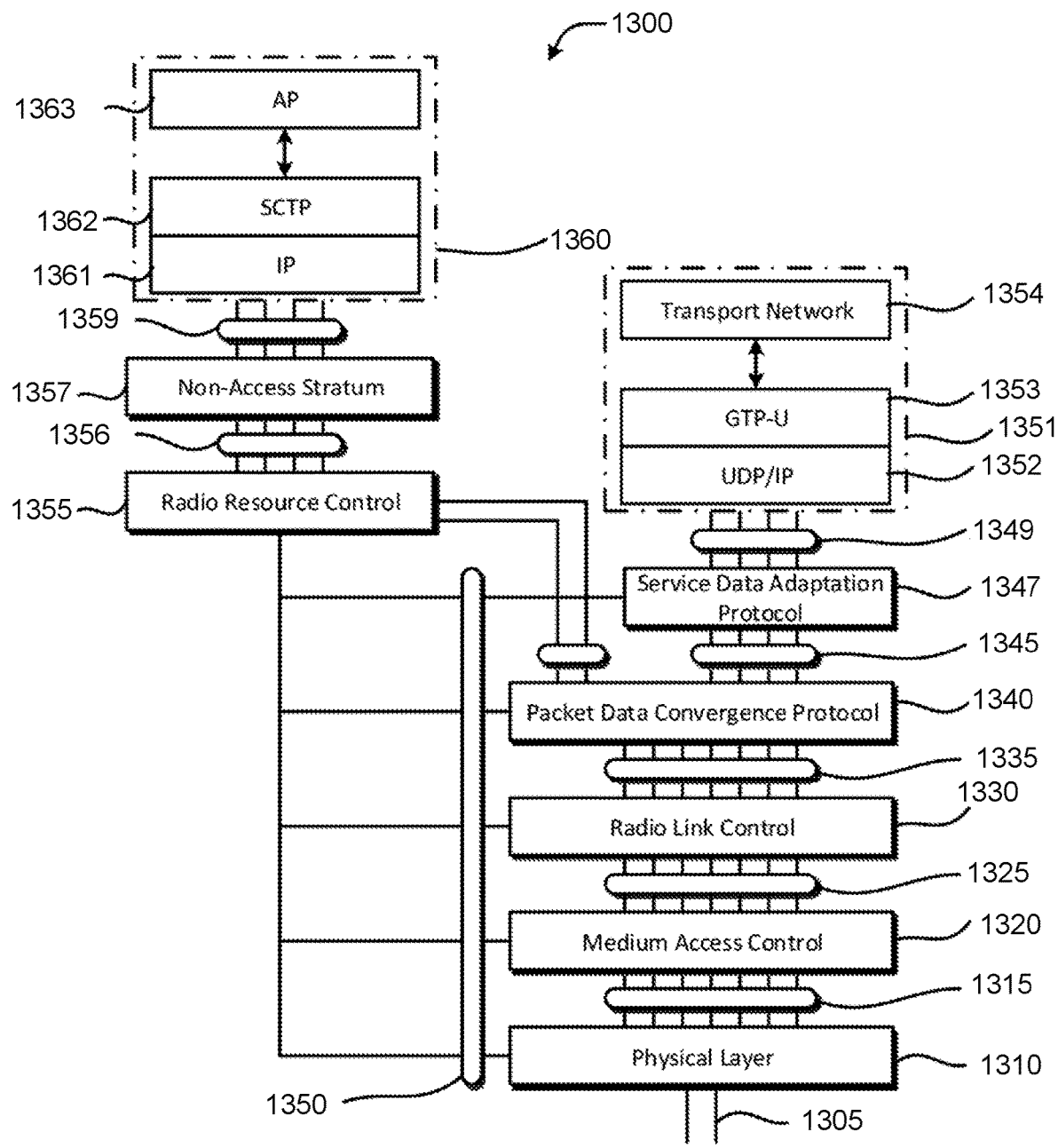
FIG. 13 depicts an illustration of various protocol functions that may be used for various protocol stacks in accordance with various embodiments.

FIG. 13 illustrates various protocol functions that may be implemented in a wireless communication device according to various embodiments. In particular, FIG. 13 includes an arrangement 1300 showing interconnections between various protocol layers/entities. The following description of FIG. 13 is provided for various protocol layers/entities that operate in conjunction with the 5G/NR system standards and LTE system standards, but some or all of the aspects of FIG. 13 may be applicable to other wireless communication network systems as well.

The protocol layers of arrangement 1300 may include one or more of PHY 1310, MAC 1320, RLC 1330, PDCP 1340, SDAP 1347, RRC 1355, and NAS layer 1357, in addition to other higher layer functions not illustrated. The protocol layers may include one or more service access points (e.g., items 1359, 1356, 1350, 1349, 1345, 1335, 1325, and 1315 in FIG. 13) that may provide communication between two or more protocol layers.

The PHY 1310 may transmit and receive physical layer signals 1305 that may be received from or transmitted to one or more other communication devices. The physical layer signals 1305 may comprise one or more physical channels, such as those discussed herein. The PHY 1310 may further perform link adaptation or adaptive modulation and coding (AMC), power control, cell search (e.g., for initial synchronization and handover purposes), and other measurements used by higher layers, such as the RRC 1355. The PHY 1310 may still further perform error detection on the transport channels, forward error correction (FEC) coding/decoding of the transport channels, modulation/demodulation of physical channels, interleaving, rate matching, mapping onto physical channels, and MIMO antenna processing. In some embodiments, an instance of PHY 1310 may process requests from and provide indications to an instance of MAC 1320 via one or more PHY-SAP 1315. According to some embodiments, requests and indications communicated via PHY-SAP 1315 may comprise one or more transport channels.

Instance(s) of MAC 1320 may process requests from, and provide indications to, an instance of RLC 1330 via one or more MAC-SAPs 1325. These requests and indications communicated via the MAC-SAP 1325 may comprise one or more logical channels. The MAC 1320 may perform mapping between the logical channels and transport channels, multiplexing of MAC SDUs from one or more logical channels onto TBs to be delivered to PHY 1310 via the transport channels, de-multiplexing MAC SDUs to one or more logical channels from TBs delivered from the PHY 1310 via transport channels, multiplexing MAC SDUs onto TBs, scheduling information reporting, error correction through HARQ, and logical channel prioritization.

Instance(s) of RLC 1330 may process requests from and provide indications to an instance of PDCP 1340 via one or more radio link control service access points (RLC-SAP) 1335. These requests and indications communicated via RLC-SAP 1335 may comprise one or more RLC channels. The RLC 1330 may operate in a plurality of modes of operation, including: Transparent Mode (TM), Unacknowledged Mode (UM), and Acknowledged Mode (AM). The RLC 1330 may execute transfer of upper layer protocol data units (PDUs), error correction through automatic repeat request (ARQ) for AM data transfers, and concatenation, segmentation and reassembly of RLC SDUs for UM and AM data transfers. The RLC 1330 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1340 may process requests from and provide indications to instance(s) of RRC 1355 and/or instance(s) of SDAP 1347 via one or more packet data convergence protocol service access points (PDCP-SAP) 1345. These requests and indications communicated via PDCP-SAP 1345 may comprise one or more radio bearers. The PDCP 1340 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1347 may process requests from and provide indications to one or more higher layer protocol entities via one or more SDAP-SAP 1349. These requests and indications communicated via SDAP-SAP 1349 may comprise one or more QoS flows. The SDAP 1347 may map QoS flows to DRBs, and vice versa, and may also mark QFIs in DL and UL packets. A single SDAP entity 1347 may be configured for an individual PDU session. In the UL direction, the NG-RAN 710 may control the mapping of QoS Flows to DRB(s) in two different ways, reflective mapping or explicit mapping. For reflective mapping, the SDAP 1347 of a UE 701 may monitor the QFIs of the DL packets for each DRB, and may apply the same mapping for packets flowing in the UL direction. For a DRB, the SDAP 1347 of the UE 701 may map the UL packets belonging to the QoS flows(s) corresponding to the QoS flow ID(s) and PDU session observed in the DL packets for that DRB. To enable reflective mapping, the NG-RAN 910 may mark DL packets over the Uu interface with a QoS flow ID. The explicit mapping may involve the RRC 1355 configuring the SDAP 1347 with an explicit QoS flow to DRB mapping rule, which may be stored and followed by the SDAP 1347. In some embodiments, the SDAP 1347 may only be used in NR implementations and may not be used in LTE implementations.

The RRC 1355 may configure, via one or more management service access points (M-SAP), aspects of one or more protocol layers, which may include one or more instances of PHY 1310, MAC 1320, RLC 1330, PDCP 1340 and SDAP 1347. In some embodiments, an instance of RRC 1355 may process requests from and provide indications to one or more NAS entities 1357 via one or more RRC-SAPs 1356. The main services and functions of the RRC 1355 may include broadcast of system information (e.g., included in MIBs or SIBs related to the NAS), broadcast of system information related to the access stratum (AS), paging, establishment, maintenance and release of an RRC connection between the UE 701 and RAN 710 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1357 may form the highest stratum of the control plane between the UE 701 and the AMF 921. The NAS 1357 may support the mobility of the UEs 701 and the session management procedures to establish and maintain IP connectivity between the UE 701 and a P-GW in LTE systems.

According to various embodiments, one or more protocol entities of arrangement 1300 may be implemented in UEs 701, RAN nodes 711, AMF 921 in NR implementations or MME 821 in LTE implementations, UPF 902 in NR implementations or S-GW 822 and P-GW 823 in LTE implementations, or the like to be used for control plane or user plane communications protocol stack between the aforementioned devices. In such embodiments, one or more protocol entities that may be implemented in one or more of UE 701, gNB 711, AMF 921, etc. may communicate with a respective peer protocol entity that may be implemented in or on another device using the services of respective lower layer protocol entities to perform such communication. In some embodiments, a gNB-CU of the gNB 711 may host the RRC 1355, SDAP 1347, and PDCP 1340 of the gNB that controls the operation of one or more gNB-DUs, and the gNB-DUs of the gNB 711 may each host the RLC 1330, MAC 1320, and PHY 1310 of the gNB 711.

In a first example, a control plane protocol stack may comprise, in order from highest layer to lowest layer, NAS 1357, RRC 1355, PDCP 1340, RLC 1330, MAC 1320, and PHY 1310. In this example, upper layers 1360 may be built on top of the NAS 1357, which includes an IP layer 1361, an SCTP 1362, and an application layer signaling protocol (AP) 1363.

In NR implementations, the AP 1363 may be an NG application protocol layer (NGAP or NG-AP) 1363 for the NG interface 713 defined between the NG-RAN node 711 and the AMF 921, or the AP 1363 may be an Xn application protocol layer (XnAP or Xn-AP) 1363 for the Xn interface 712 that is defined between two or more RAN nodes 711.

The NG-AP 1363 may support the functions of the NG interface 713 and may comprise Elementary Procedures (EPs). An NG-AP EP may be a unit of interaction between the NG-RAN node 711 and the AMF 921. The NG-AP 1363 services may comprise two groups: UE-associated services (e.g., services related to a UE 701, 702) and non-UE-associated services (e.g., services related to the whole NG interface instance between the NG-RAN node 711 and AMF 921). These services may include functions including, but not limited to: a paging function for the sending of paging requests to NG-RAN nodes 711 involved in a particular paging area; a UE context management function for allowing the AMF 921 to establish, modify, and/or release a UE context in the AMF 921 and the NG-RAN node 711; a mobility function for UEs 701 in ECM-CONNECTED mode for intra-system HOs to support mobility within NG-RAN and inter-system HOs to support mobility from/to EPS systems; a NAS Signaling Transport function for transporting or rerouting NAS messages between UE 701 and AMF 921; a NAS node selection function for determining an association between the AMF 921 and the UE 701; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 711 via CN 720; and/or other like functions.

The XnAP 1363 may support the functions of the Xn interface 712 and may comprise XnAP basic mobility procedures and XnAP global procedures. The XnAP basic mobility procedures may comprise procedures used to handle UE mobility within the NG RAN 711 (or E-UTRAN 810), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 701, such as Xn interface setup and reset procedures, NG-RAN update procedures, cell activation procedures, and the like.

In LTE implementations, the AP 1363 may be an S1 Application Protocol layer (S1-AP) 1363 for the S1 interface 713 defined between an E-UTRAN node 711 and an MME, or the AP 1363 may be an X2 application protocol layer (X2AP or X2-AP) 1363 for the X2 interface 712 that is defined between two or more E-UTRAN nodes 711.

The S1 Application Protocol layer (S1-AP) 1363 may support the functions of the S1 interface, and similar to the NG-AP discussed previously, the S1-AP may comprise S1-AP EPs. An S1-AP EP may be a unit of interaction between the E-UTRAN node 711 and an MME 821 within an LTE CN 720. The S1-AP 1363 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1363 may support the functions of the X2 interface 712 and may comprise X2AP basic mobility procedures and X2AP global procedures. The X2AP basic mobility procedures may comprise procedures used to handle UE mobility within the E-UTRAN 720, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 701, such as X2 interface setup and reset procedures, load indication procedures, error indication procedures, cell activation procedures, and the like.

The SCTP layer (alternatively referred to as the SCTP/IP layer) 1362 may provide guaranteed delivery of application layer messages (e.g., NGAP or XnAP messages in NR implementations, or S1-AP or X2AP messages in LTE implementations). The SCTP 1362 may ensure reliable delivery of signaling messages between the RAN node 711 and the AMF 921/MME 821 based, in part, on the IP protocol, supported by the IP 1361. The Internet Protocol layer (IP) 1361 may be used to perform packet addressing and routing functionality. In some implementations the IP layer 1361 may use point-to-point transmission to deliver and convey PDUs. In this regard, the RAN node 711 may comprise L2 and L1 layer communication links (e.g., wired or wireless) with the MME/AMF to exchange information.

In a second example, a user plane protocol stack may comprise, in order from highest layer to lowest layer, SDAP 1347, PDCP 1340, RLC 1330, MAC 1320, and PHY 1310. The user plane protocol stack may be used for communication between the UE 701, the RAN node 711, and UPF 902 in NR implementations or an S-GW 822 and P-GW 823 in LTE implementations. In this example, upper layers 1351 may be built on top of the SDAP 1347, and may include a user datagram protocol (UDP) and IP security layer (UDP/IP) 1352, a General Packet Radio Service (GPRS) Tunneling Protocol for the user plane layer (GTP-U) 1353, and a User Plane PDU layer (UP PDU) 1363.

The transport network layer 1354 (also referred to as a "transport layer") may be built on IP transport, and the GTP-U 1353 may be used on top of the UDP/IP layer 1352 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1353 may be used for carrying user data within the GPRS core network and between the radio access network and the core network. The user data transported can be packets in any of IPv4, IPv6, or PPP formats, for example. The UDP/IP 1352 may provide checksums for data integrity, port numbers for addressing different functions at the source and destination, and encryption and authentication on the selected data flows. The RAN node 711 and the S-GW 822 may utilize an S1-U interface to exchange user plane data via a protocol stack comprising an L1 layer (e.g., PHY 1310), an L2 layer (e.g., MAC 1320, RLC 1330, PDCP 1340, and/or SDAP 1347), the UDP/IP layer 1352, and the GTP-U 1353. The S-GW 822 and the P-GW 823 may utilize an S5/S8a interface to exchange user plane data via a protocol stack comprising an L1 layer, an L2 layer, the UDP/IP layer 1352, and the GTP-U 1353. As discussed previously, NAS protocols may support the mobility of the UE 701 and the session management procedures to establish and maintain IP connectivity between the UE 701 and the P-GW 823.

Moreover, although not shown by FIG. 13, an application layer may be present above the AP 1363 and/or the transport network layer 1354. The application layer may be a layer in which a user of the UE 701, RAN node 711, or other network element interacts with software applications being executed, for example, by application circuitry 1005 or application circuitry 1105, respectively. The application layer may also provide one or more interfaces for software applications to interact with communications systems of the UE 701 or RAN node 711, such as the baseband circuitry 1210. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 14:
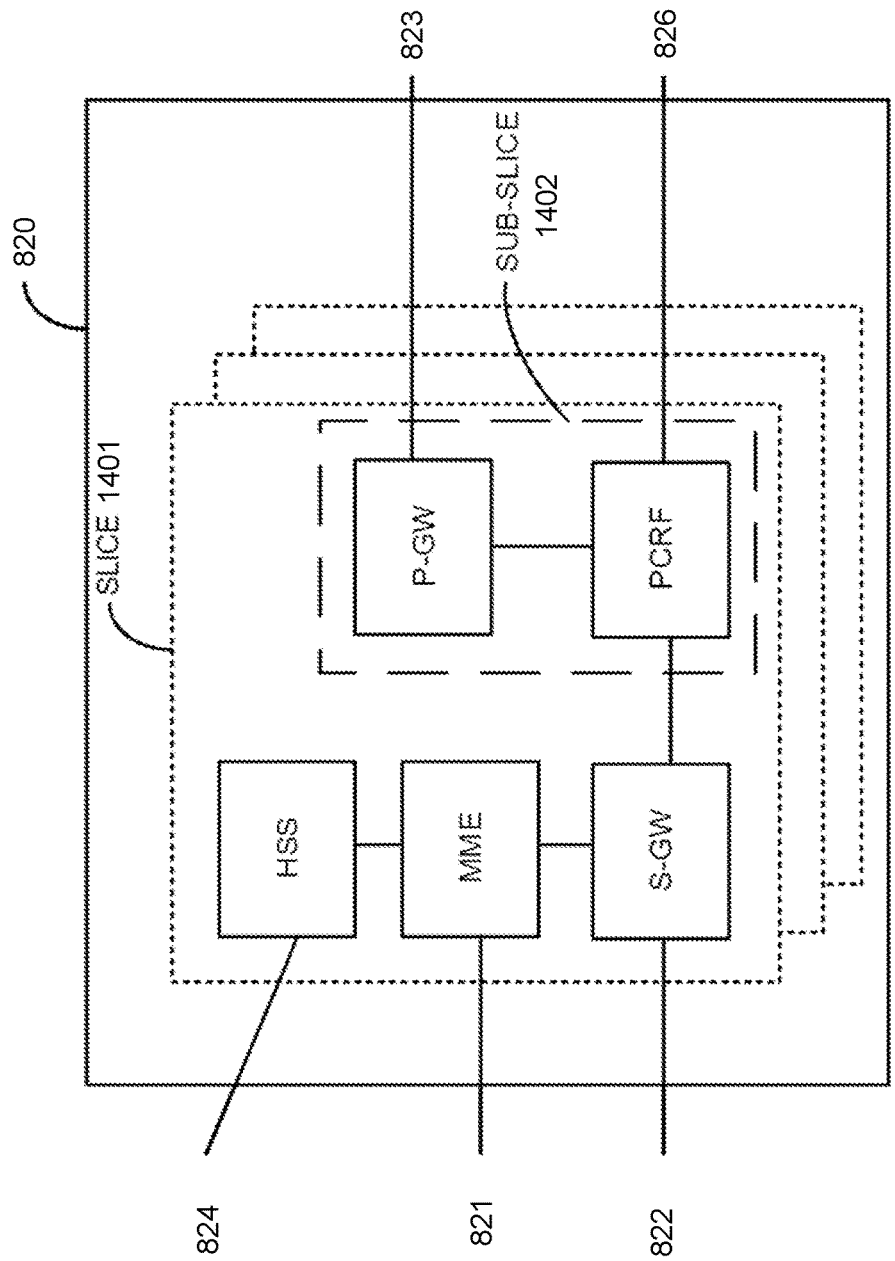
FIG. 14 illustrates components of a core network in accordance with various embodiments.

FIG. 14 illustrates components of a core network in accordance with various embodiments. The components of the CN 820 may be implemented in one physical node or separate physical nodes including components to read and execute instructions from a machine-readable or computer-readable medium (e.g., a non-transitory machine-readable storage medium). In some embodiments, the components of CN 920 may be implemented in a same or similar manner as discussed herein with regard to the components of CN 820. In some embodiments, NFV is utilized to virtualize any or all of the above-described network node functions via executable instructions stored in one or more computer-readable storage mediums (described in further detail below). A logical instantiation of the CN 820 may be referred to as a network slice 1401, and individual logical instantiations of the CN 820 may provide specific network capabilities and network characteristics. A logical instantiation of a portion of the CN 820 may be referred to as a network sub-slice 1402 (e.g., the network sub-slice 1402 is shown to include the P-GW 823 and the PCRF 826).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 9), a network slice always comprises a RAN part and a CN part. The support of network slicing relies on the principle that traffic for different slices is handled by different PDU sessions. The network can realize the different network slices by scheduling and also by providing different L1/L2 configurations. The UE 901 provides assistance information for network slice selection in an appropriate RRC message, if it has been provided by NAS. While the network can support large number of slices, the UE need not support more than 8 slices simultaneously.

A network slice may include the CN 920 control plane and user plane NFs, NG-RANs 910 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 901 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 921 instance serving an individual UE 901 may belong to each of the network slice instances serving that UE.

Network Slicing in the NG-RAN 910 involves RAN slice awareness. RAN slice awareness includes differentiated handling of traffic for different network slices, which have been pre-configured. Slice awareness in the NG-RAN 910 is introduced at the PDU session level by indicating the S-NSSAI corresponding to a PDU session in all signaling that includes PDU session resource information. How the NG-RAN 910 supports the slice enabling in terms of NG-RAN functions (e.g., the set of network functions that comprise each slice) is implementation dependent. The NG-RAN 910 selects the RAN part of the network slice using assistance information provided by the UE 901 or the 5GC 920, which unambiguously identifies one or more of the pre-configured network slices in the PLMN. The NG-RAN 910 also supports resource management and policy enforcement between slices as per SLAs. A single NG-RAN node may support multiple slices, and the NG-RAN 910 may also apply an appropriate RRM policy for the SLA in place to each supported slice. The NG-RAN 910 may also support QoS differentiation within a slice.

The NG-RAN 910 may also use the UE assistance information for the selection of an AMF 921 during an initial attach, if available. The NG-RAN 910 uses the assistance information for routing the initial NAS to an AMF 921. If the NG-RAN 910 is unable to select an AMF 921 using the assistance information, or the UE 901 does not provide any such information, the NG-RAN 910 sends the NAS signaling to a default AMF 921, which may be among a pool of AMFs 921. For subsequent accesses, the UE 901 provides a temp ID, which is assigned to the UE 901 by the 5GC 920, to enable the NG-RAN 910 to route the NAS message to the appropriate AMF 921 as long as the temp ID is valid. The NG-RAN 910 is aware of, and can reach, the AMF 921 that is associated with the temp ID. Otherwise, the method for initial attach applies.

The NG-RAN 910 supports resource isolation between slices. NG-RAN 910 resource isolation may be achieved by means of RRM policies and protection mechanisms that should avoid that shortage of shared resources if one slice breaks the service level agreement for another slice. In some implementations, it is possible to fully dedicate NG-RAN 910 resources to a certain slice. How NG-RAN 910 supports resource isolation is implementation dependent.

Some slices may be available only in part of the network. Awareness in the NG-RAN 910 of the slices supported in the cells of its neighbors may be beneficial for inter-frequency mobility in connected mode. The slice availability may not change within the UE's registration area. The NG-RAN 910 and the 5GC 920 are responsible to handle a service request for a slice that may or may not be available in a given area. Admission or rejection of access to a slice may depend on factors such as support for the slice, availability of resources, support of the requested service by NG-RAN 910.

The UE 901 may be associated with multiple network slices simultaneously. In case the UE 901 is associated with multiple slices simultaneously, only one signaling connection is maintained, and for intra-frequency cell reselection, the UE 901 tries to camp on the best cell. For inter-frequency cell reselection, dedicated priorities can be used to control the frequency on which the UE 901 camps. The 5GC 920 is to validate that the UE 901 has the rights to access a network slice. Prior to receiving an Initial Context Setup Request message, the NG-RAN 910 may be allowed to apply some provisional/local policies, based on awareness of a particular slice that the UE 901 is requesting to access. During the initial context setup, the NG-RAN 910 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 15:
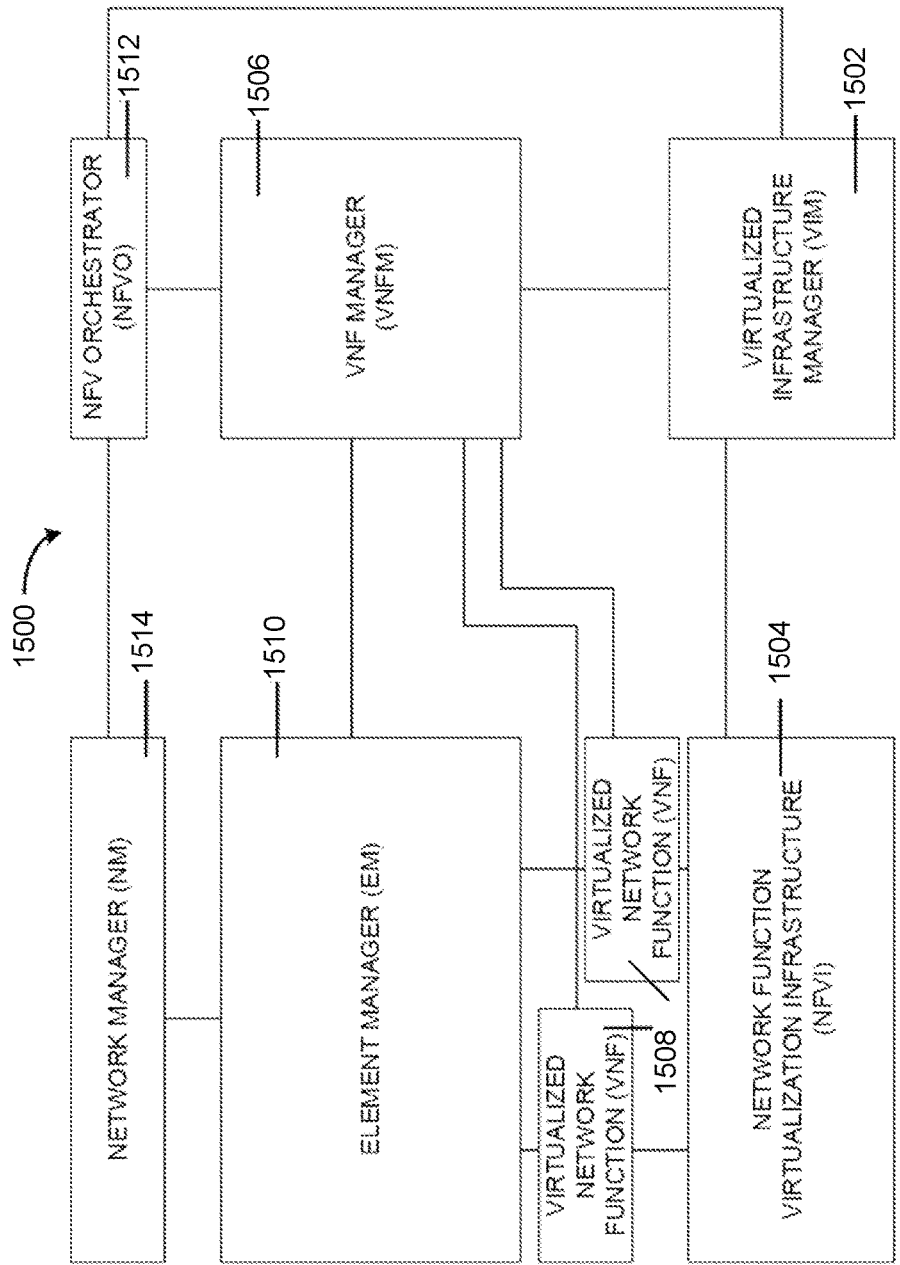
FIG. 15 is a block diagram illustrating components, according to some example embodiments, of a system to support network functions virtualization (NFV).

FIG. 15 is a block diagram illustrating components, according to some example embodiments, of a system 1500 to support NFV. The system 1500 is illustrated as including a VIM 1502, an NFVI 1504, a VNFM 1506, VNFs 1508, an EM 1510, an NFVO 1512, and a NM 1514.

The VIM 1502 manages the resources of the NFVI 1504. The NFVI 1504 can include physical or virtual resources and applications (including hypervisors) used to execute the system 1500. The VIM 1502 may manage the life cycle of virtual resources with the NFVI 1504 (e.g., creation, maintenance, and tear down of VMs associated with one or more physical resources), track VM instances, track performance, fault and security of VM instances and associated physical resources, and expose VM instances and associated physical resources to other management systems.

The VNFM 1506 may manage the VNFs 1508. The VNFs 1508 may be used to execute EPC components/functions. The VNFM 1506 may manage the life cycle of the VNFs 1508 and track performance, fault and security of the virtual aspects of VNFs 1508. The EM 1510 may track the performance, fault and security of the functional aspects of VNFs 1508. The tracking data from the VNFM 1506 and the EM 1510 may comprise, for example, PM data used by the VIM 1502 or the NFVI 1504. Both the VNFM 1506 and the EM 1510 can scale up/down the quantity of VNFs of the system 1500.

The NFVO 1512 may coordinate, authorize, release and engage resources of the NFVI 1504 in order to provide the requested service (e.g., to execute an EPC function, component, or slice). The NM 1514 may provide a package of end-user functions with the responsibility for the management of a network, which may include network elements with VNFs, non-virtualized network functions, or both (management of the VNFs may occur via the EM 1510).

Figure 16:
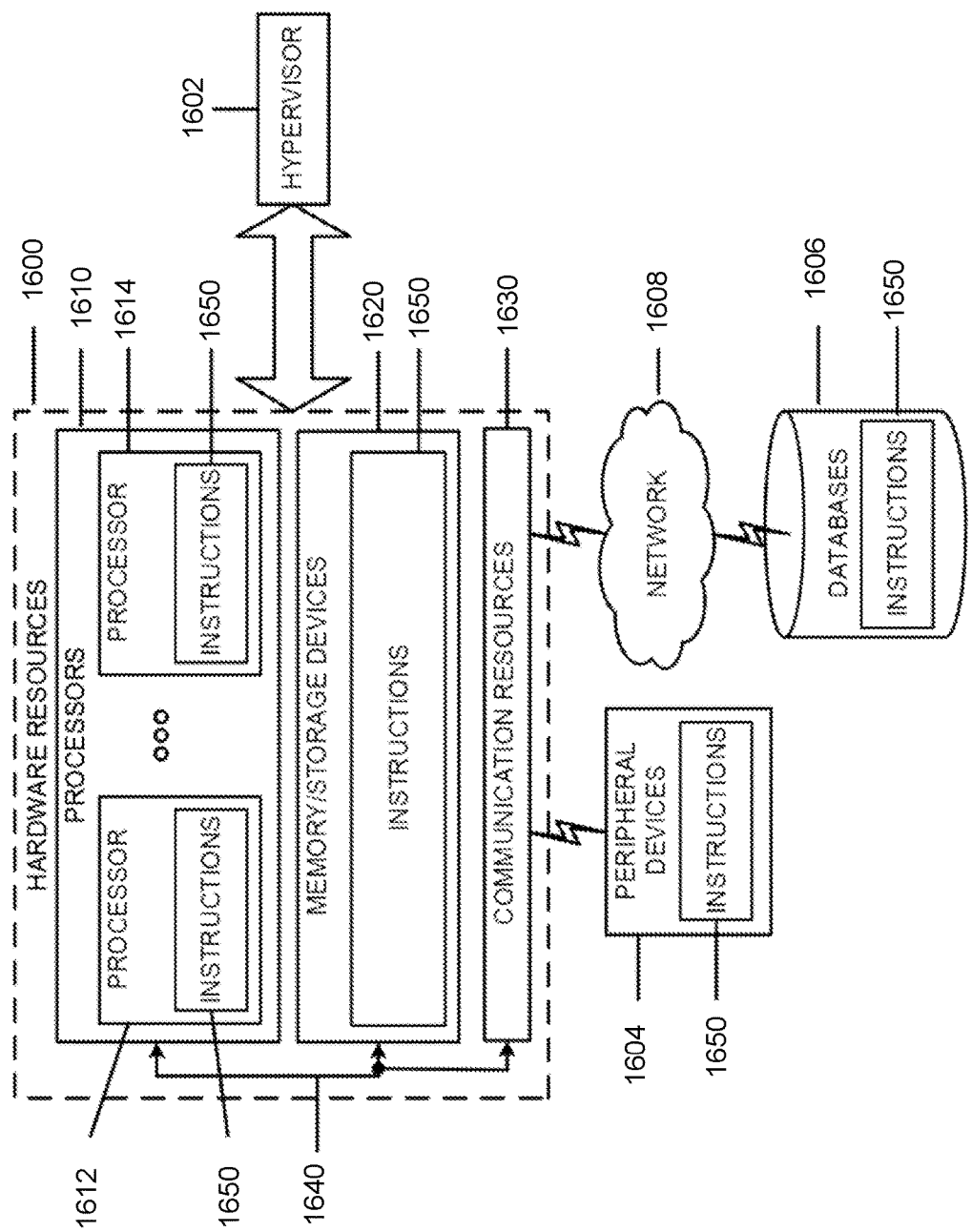
FIG. 16 depicts a block diagram illustrating components, according to some example embodiments, able to read instructions from a machine-readable or computer-readable medium (e.g., a non-transitory machine-readable storage medium) and perform any one or more of the methodologies discussed herein

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 may include, for example, a processor 1612 and a processor 1614. The processor(s) 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via USB), cellular communication components, NFC components, Bluetooth® (or Bluetooth® Low Energy) components, Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include this disclosure provides details on grant based PUSCH (GB PUCH) transmission and configured grant based PUSCH (CG PUSCH) transmission in NR Systems Operating on Unlicensed Spectrum Example 2 may include the method of example 1 or some other example herein, wherein only DCI 0_1 is extended to schedule multi-TTI PUSCH.

Example 3 may include the method of example 1 or some other example herein, wherein a DCI scheduling multi-TTI PUSCH has different number of CBGTI bits per TB from a DCI scheduling single-TTI PUSCH, CBG regrouping is adopted.

Example 4 may include the method of example 1 or some other example herein, wherein for CBG based PUSCH transmission, N>1 HARQ-ACK bits are allocated for each HARQ process configured for CG, while only 1 bit is allocated for other HARQ processes.

Example 5 may include the method of example 1 or some other example herein, wherein for CBG based PUSCH transmission, N>1 HARQ-ACK bits are allocated for a subset of HARQ processes configured for CG, while only 1 bit is allocated for all other HARQ processes.

Example 6 may include the method of example 1 or some other example herein, wherein for GB multi-slot PUSCH, UE transmits continuously in multiple slots once UE occupied the channel by successfully performing a LBT.

Example 7 may include the method of example 6 or some other example herein, wherein UE follows the start symbol indicated in the first slot for the channel occupation, while UE follows the end symbol indicated in the last slot for the channel occupation.

Example 8 may include the method of example 6 or some other example herein, wherein if LBT fails in a first slot, UE tries LBT at symbol 0 of next slot.

Example 9 may include the method of example 6 or some other example herein, wherein if UE is indicated as NO LBT, UE does NO LBT to start its transmission in each UL burst, or, UE only do NO LBT in the exactly first UL burst, or, UE does NO LBT if the start symbol of the multi-slot PUSCH follows a downlink symbol or flexible symbol as indicated by DCI 2_0.

Example 10 may include the method of example 6 or some other example herein, wherein DMRS for a slot of the multi-slot PUSCH follows PUSCH type indicated by DCI; or, only DMRS of the first slot follows PUSCH type indicated by DCI, and DMRS of remaining slot uses DMRS of PUSCH type A.

Example 11 may include the method of example 6 or some other example herein, wherein CSI is prioritized to be piggybacked on a last slot of a multi-slot PUSCH if the PUSCH in the slot is actually available for transmission, or if NO LBT is used to schedule a multi-slot PUSCH, CSI is piggybacked on the exactly first slot.

Example 12 may include the method of example 1 or some other example herein, wherein CG-UCI is piggybacked only in the first slot repetition of a TB, or CG-UCI is piggybacked in each slot, or, CG-UCI is piggybacked in beginning slot repetition of a TB on each UL burst.

Example 13 may include the method of example 1 or some other example herein, wherein UE does rate matching of the TB over N slots, and the rate matching operation is repeated M times for a total number of slot repetition MN.

Example 14 may include the method of example 1 or some other example herein, wherein start position of PUSCH is determined as an offset X on symbol k, k is index of start symbol of SLIV.

Example 15 may include the method of example 1 or some other example herein, wherein start position of PUSCH is determined as an offset X on symbol k−1 or k−2 or k−4.

Example 16 may include the method of examples 14 or 15 or some other example herein, wherein start positions is generated in 1 or 2 or 4 symbols, or start positions is fixedly generated in one symbol of SCS 15 kHz.

Example 17 may include the method of examples 14 or 15 or some other example herein, wherein inside an gNB-initiated COT, only start position with offset X>25 µs is applicable to CG PUSCH, or, only start position with offset X>16 µs is applicable to CG PUSCH.

Example 18 may include the method of examples 14 or 15 or some other example herein, wherein inside a gNB-initiated COT, NO LBT is indicated in DCI for GB PUSCH, while CG PUSCH use 25 µs LBT.

Example 19 may include an apparatus comprising means to perform one or more elements of a method described in or related to any of examples 1-18, or any other method or process described herein.

Example 20 may include one or more non-transitory computer-readable media comprising instructions to cause an electronic device, upon execution of the instructions by one or more processors of the electronic device, to perform one or more elements of a method described in or related to any of examples 1-18, or any other method or process described herein.

Example 21 may include an apparatus comprising logic, modules, or circuitry to perform one or more elements of a method described in or related to any of examples 1-18, or any other method or process described herein.

Example 22 may include a method, technique, or process as described in or related to any of examples 1-18, or portions or parts thereof.

Example 23 may include an apparatus comprising: one or more processors and one or more computer-readable media comprising instructions that, when executed by the one or more processors, cause the one or more processors to perform the method, techniques, or process as described in or related to any of examples 1-18, or portions thereof.

Example 24 may include a signal as described in or related to any of examples 1-18, or portions or parts thereof.

Example 25 may include a signal in a wireless network as shown and described herein.

Example 26 may include a method of communicating in a wireless network as shown and described herein.

Example 27 may include a system for providing wireless communication as shown and described herein.

Example 28 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NS SAI 'Network Slice Selection Assistance Information
S-NNSAI Single-NSSAI
NS SF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An Access Point (AP), the AP comprising:
   processor circuitry configured to:
   schedule multiple transmission time intervals (multi-TTIs) in a physical uplink shared channel (PUSCH) in an unlicensed spectrum; and
   generate a downlink control information (DCI) to include the scheduled multi-TTIs and a hybrid automatic repeat and request acknowledgement (HARQ-ACK) assessment information associated with the scheduled multi-TTIs, wherein the DCI comprises a number of scheduled slots, and wherein the number of scheduled slots corresponds with a number of transport blocks for transmission in the PUSCH; and
   radio front end circuitry, coupled to the processor circuitry, configured to:

transmit the DCI to a user equipment (UE) device over the unlicensed spectrum.

2. The AP of claim 1, wherein the DCI further comprises code block group transmission information (CBGTI) bits per transport block (TB) for the multi-TTIs in the PUSCH.

3. The AP of claim 1, wherein the DCI further comprises at least one bit that corresponds to a HARQ process identifier (ID) of a plurality of HARQ process IDs for code block group (CBG) based PUSCH transmission.

4. The AP of claim 1, wherein the DCI further comprises at least one bit that corresponds to a HARQ process identifier (ID) of a subset of a plurality of HARQ process IDs for code block group (CBG) based PUSCH transmission.

5. The AP of claim 1, wherein the DCI further comprises one bit that corresponds to a plurality of HARQ process identifiers (IDs) for non-code block group (CBG) based PUSCH transmission.

6. The AP of claim 1, wherein the PUSCH is a grant based PUSCH (GB PUSCH) or a configured grant based PUSCH (CG PUSCH).

7. The AP of claim 1, wherein a maximum of the number of scheduled slots is predefined or configured by radio resource control (RRC) signaling.

8. A method comprising:
scheduling, at an access point (AP), multiple transmission time intervals (multi-TTIs) in a physical uplink shared channel (PUSCH) in an unlicensed spectrum;
generating, at the AP, a downlink control information (DCI) to include the scheduled multi-TTIs and a hybrid automatic repeat request acknowledgement (HARQ-ACK) assessment information associated with the scheduled multi-TTIs, wherein the DCI comprises a number of scheduled slots, and wherein the number of scheduled slots corresponds with a number of transport blocks for transmission in the PUSCH; and
transmitting, from the AP to a user equipment (UE), the DCI over the unlicensed spectrum.

9. The method of claim 8, wherein the DCI further comprises code block group transmission information (CBGTI) bits per transport block (TB) for the multi-TTIs in the PUSCH.

10. The method of claim 8, wherein the DCI further comprises at least one bit that corresponds to a HARQ process identifier (ID) of a plurality of HARQ process IDs for code block group (CBG) based PUSCH transmission.

11. The method of claim 8, wherein the DCI further comprises at least one bit that corresponds to a HARQ process identifier (ID) of a subset of a plurality of HARQ process IDs for code block group (CBG) based PUSCH transmission.

12. The method of claim 8, wherein the DCI further comprises one bit that corresponds to a plurality of HARQ process identifiers (IDs) for non-code block group (CBG) based PUSCH transmission.

13. The method of claim 8, wherein the PUSCH is a grant based PUSCH (GB PUSCH) or a configured grant based PUSCH (CG PUSCH).

14. The method of claim 8, wherein a maximum of the number of scheduled slots is predefined or configured by radio resource control (RRC) signaling.

15. A non-transitory computer-readable media (CRM) comprising computer instructions, wherein execution of the computer instructions by one or more processors of an access point (AP), causes the one or more processors to:
schedule multiple transmission time intervals (multi-TTIs) in a physical uplink shared channel (PUSCH) in an unlicensed spectrum;
generate a downlink control information (DCI) to include the scheduled multi-TTIs and a hybrid automatic repeat request acknowledgement (HARQ-ACK) assessment information associated with the scheduled multi-TTIs, wherein the DCI comprises a number of scheduled slots, and wherein the number of scheduled slots corresponds with a number of transport blocks for transmission in the PUSCH; and
transmit the DCI to a user equipment (UE) device over the unlicensed spectrum.

16. The non-transitory CRM of claim 15, wherein the DCI further comprises code block group transmission information (CBGTI) bits per transport block (TB) for the multi-TTIs in the PUSCH.

17. The non-transitory CRM of claim 15, wherein the DCI further comprises at least one bit that corresponds to a HARQ process identifier (ID) of a plurality of HARQ process IDs for code block group (CBG) based PUSCH transmission or a HARQ process identifier (ID) of a subset of the plurality of the HARQ process IDs for the CBG based PUSCH transmission.

18. The non-transitory CRM of claim 15, wherein the DCI further comprises one bit that corresponds to a plurality of HARQ process identifiers (IDs) for non-code block group (CBG) based PUSCH transmission.

19. The non-transitory CRM of claim 15, wherein the PUSCH transmission is a grant based PUSCH (GB PUSCH) or a configured grant based PUSCH (CG PUSCH).

20. The non-transitory CRM of claim 15, wherein a maximum of the number of scheduled slots is predefined or configured by radio resource control (RRC) signaling.

* * * * *